(12) United States Patent
Narumi

(10) Patent No.: US 11,908,215 B2
(45) Date of Patent: Feb. 20, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yuki Narumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 17/540,888

(22) Filed: Dec. 2, 2021

(65) Prior Publication Data

US 2022/0189187 A1 Jun. 16, 2022

(30) Foreign Application Priority Data

Dec. 11, 2020 (JP) ................................. 2020-205910

(51) Int. Cl.
*G06V 30/22* (2022.01)
*G06T 7/11* (2017.01)
*G06V 30/148* (2022.01)
*G06V 30/18* (2022.01)
*G06T 7/70* (2017.01)
*G06V 30/32* (2022.01)
*G06V 30/222* (2022.01)
*G06V 30/19* (2022.01)

(52) U.S. Cl.
CPC ................ *G06V 30/22* (2022.01); *G06T 7/11* (2017.01); *G06T 7/70* (2017.01); *G06V 30/153* (2022.01); *G06V 30/1801* (2022.01); *G06V 30/222* (2022.01); *G06V 30/32* (2022.01); *G06T 2207/30176* (2013.01); *G06V 30/1908* (2022.01)

(58) Field of Classification Search
CPC .. G06V 30/22; G06V 30/153; G06V 30/1801; G06V 30/32; G06V 30/222; G06V 30/1908; G06T 7/11; G06T 7/70; G06T 2207/30176
See application file for complete search history.

(56) References Cited

U.S. PATENT DOCUMENTS

| | | | | |
|---|---|---|---|---|
| 5,781,660 A | * | 7/1998 | Nitta | G06V 30/1478 382/173 |
| 9,607,237 B2 | | 3/2017 | Wada | G06K 9/3283 |
| 10,185,882 B2 | * | 1/2019 | Elarian | G06F 21/36 |
| 2006/0078200 A1 | * | 4/2006 | Koyama | G06V 30/2455 382/181 |
| 2016/0092745 A1 | * | 3/2016 | Wada | G06V 30/1478 382/177 |

FOREIGN PATENT DOCUMENTS

| | | |
|---|---|---|
| JP | H08-44819 | 2/1996 |
| JP | 2014-228953 | 12/2014 |

* cited by examiner

*Primary Examiner* — Siamak Harandi
*Assistant Examiner* — Daniella M. DiGuglielmo
(74) *Attorney, Agent, or Firm* — Venable LLP

(57) ABSTRACT

An object is to improve character recognition accuracy of handwritten characters, originally a single continuous character string, described discontinuously. An image area corresponding to a handwritten character is separated from a document image obtained by scanning a document and a character block including characters having the same baseline is extracted. Then, in a case where a plurality of character blocks is extracted from the first image area, a single character block is generated by combining character blocks based on a position relationship of the plurality of character blocks.

18 Claims, 24 Drawing Sheets

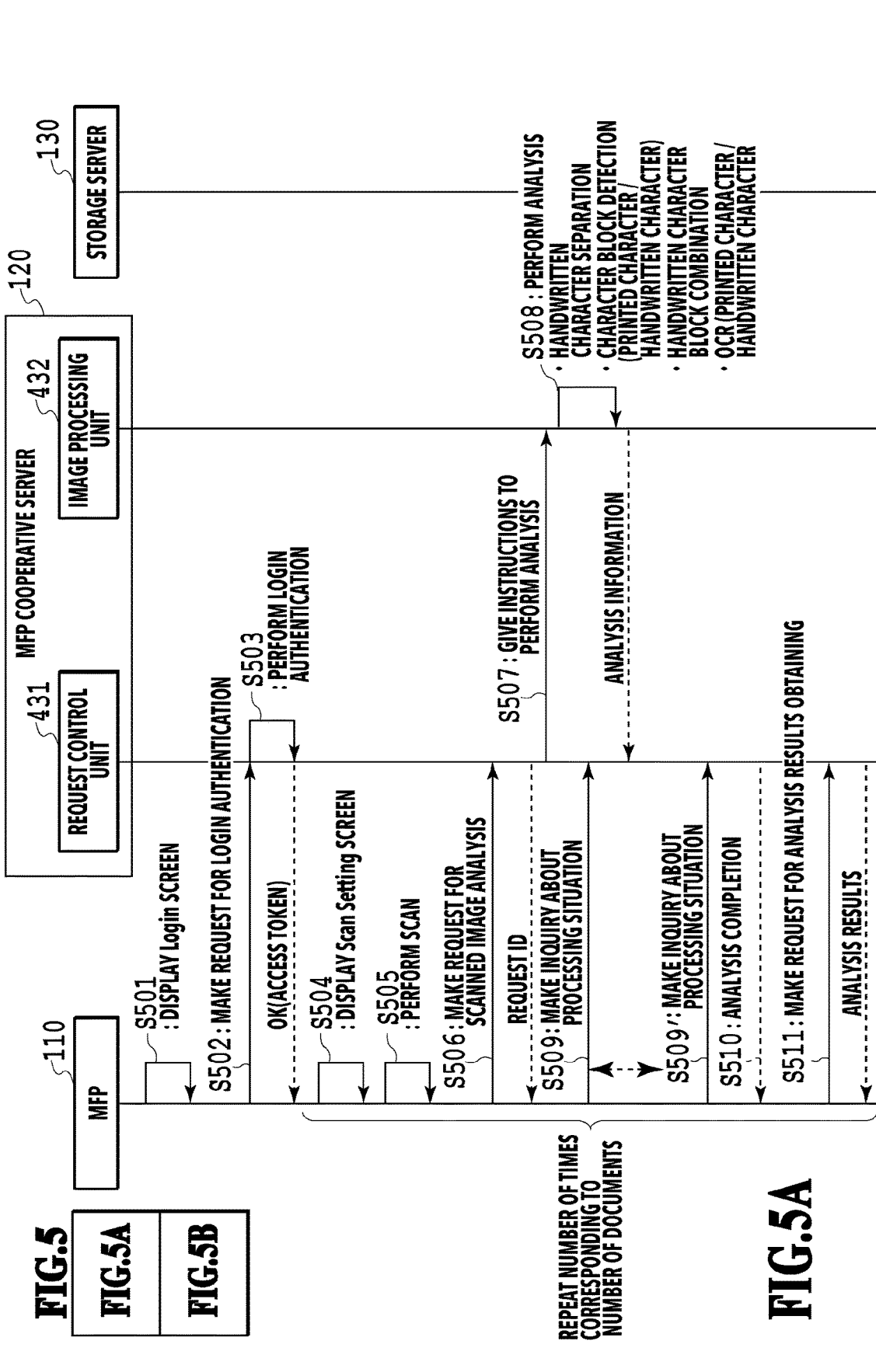

FIG.9A

```
{
"processId": "00039000-5555-3f33-5552-6999c30bcccc"
}
```

FIG.9B

```
{
"status": "processing"
}
```

FIG.9C

```
{
"status": "completed",
"ocrResultUrl": "https://mfpservice/output-images/00039000-5555-3f33-5552-6999c30bcccc/ocrResult.json",
}
```

Storage Saving ~1000

~1002 Transmit  ~1003 Edit  ~1004 Delete

~1001

| Scanned document list | | |
|---|---|---|
| Document ID | Transmission destination | Type |
| 001 | cloud storage A | membership application form |
| 002 | cloud storage A | membership application form |
| 003 | cloud storage A | membership application form |
| 004 | cloud storage A | membership application form |
| 005 | cloud storage A | membership application form |

Membership application form

| Applicant | Dian Fossey |
|---|---|
| Address | zip code CA 94065  Redwood City<br>1438 Elwood Street  telephone number 3333-33-3333 |

FIG.13A

Dian Fossey
    CA 94065        Redwood City
1438 Elwood Street
                                3333-33-3333

FIG.13B

Membership application form

| Applicant | |
|---|---|
| Address | zip code<br><br>                        telephone number |

FIG.13C

Membership application form

| Applicant | | 1601 |
|---|---|---|
| Address | zip code<br>telephone number | 1602 |

FIG.16

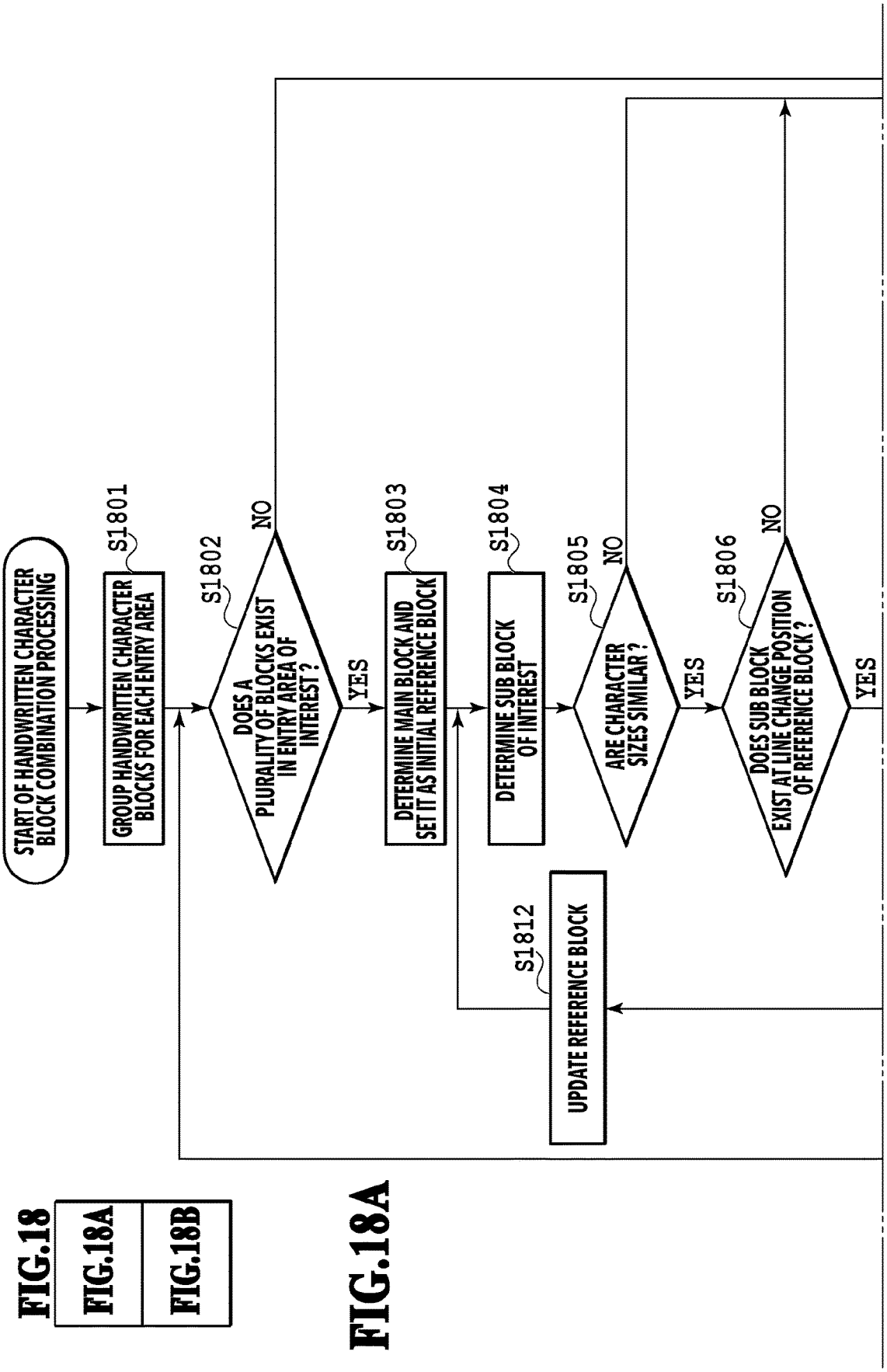

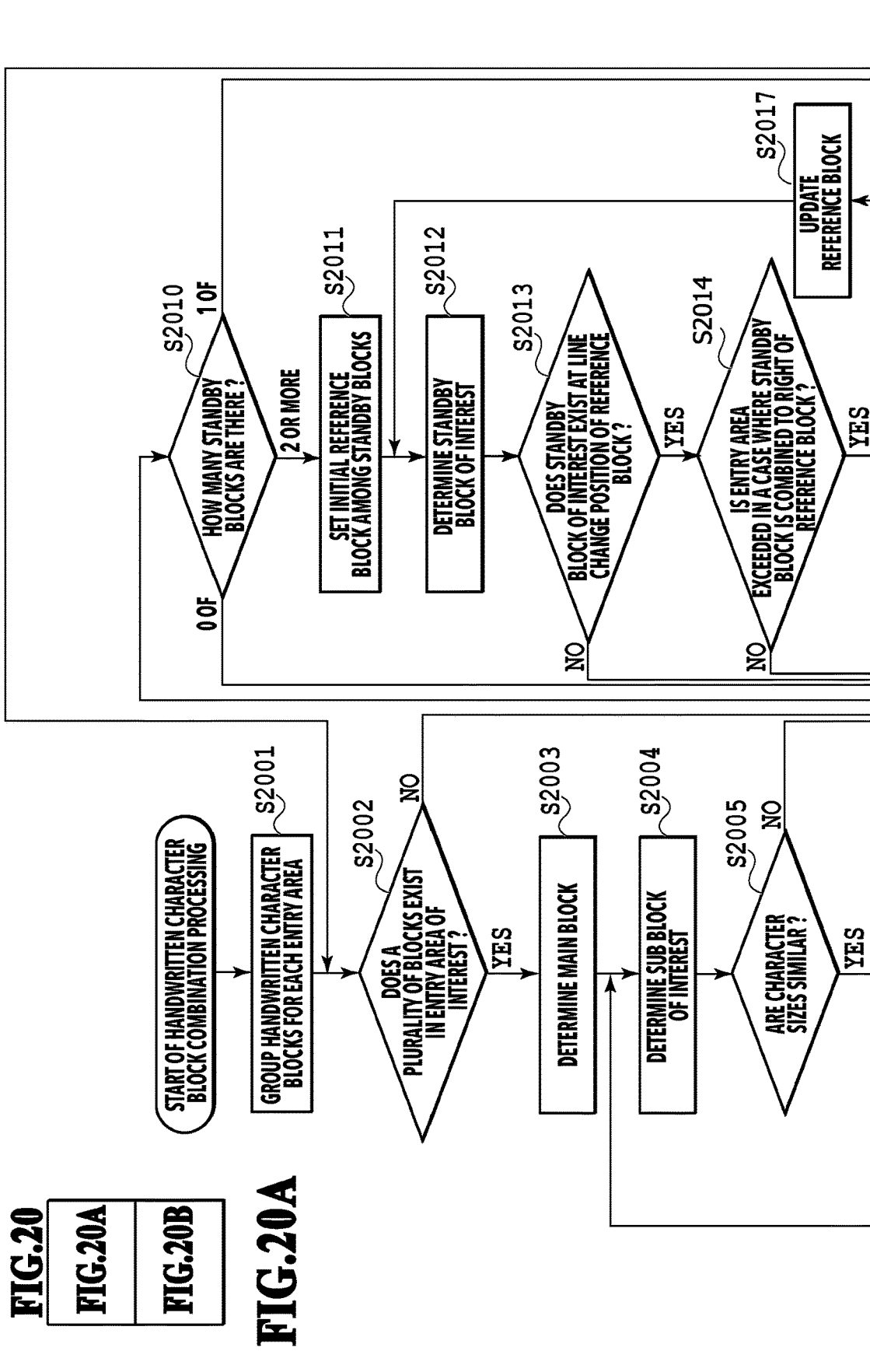

INFORMATION PROCESSING APPARATUS, INFORMATION PROCESSING METHOD, AND STORAGE MEDIUM

BACKGROUND OF THE INVENTION

Field of the Invention

The technique of the present disclosure relates to a technique to extract character information from a document image.

Description of the Related Art

Conventionally, there is a technique to read and recognize a character within a document image obtained by scanning the document. This technique is generally called OCR (Optical Character Recognition). Normally, the OCR processing consists of image preprocessing to modify a document image to an image suitable to OCR, processing to extract an area (character block) in which a character is described from a document image, and character recognition processing to identify each character included in an extracted character block in reading order (along arrangement direction). Then, some recent character recognition processing has a function (language model function) to determine a character whose possibility of appearance is strong from a connection relationship of context in a plurality of characters existing within a character block by performing semantic interpretation by language learning in order to improve character recognition accuracy. In this case, by inputting each character block having consistency of meaning, such as a character block relating to a specific item, it can be expected to further improve the character recognition accuracy. That is, it is very important to accurately extract a character block for each item or the like within a document in block extraction in the previous stage. In this regard, for example, as the prior art relating to the character row recognition (determination of which row a character belongs to), there are Japanese Patent Laid-Open No. H8-44819 and Japanese Patent Laid-Open No. 2014-228953.

First, Japanese Patent Laid-Open No. H8-44819 has disclosed a technique to avoid an error in character row recognition due to a bend of a document image and the like. Specifically, a method has been disclosed in which whether two adjacent characters belong to the same row is determined by the degree of overlap of the circumscribed rectangles of the two adjacent characters in the longitudinal direction and the character row recognition is performed by repeating the determination. Further, Japanese Patent Laid-Open No. 2014-228953 has disclosed a technique to perform character row recognition for a character string with a large distortion (printing onto a three-dimensional medium, deviation in printing due to failure of printer, and the like). A method of determining which characters that are adjacent belong to the same row by comparing the strength of connection, such as the degree of overlap of the characters and the similarity of features and selecting a candidate row whose connection is stronger.

In general, in a case of a document in which a handwritten character and a printed character exist in a mixed manner, such as a questionnaire form and an application form, it is frequent that handwritten characters are written with a discontinuous baseline. This is because a person who fills in a form does not start writing in view of the arrangement of each character in advance at the time of filling in an entry field and the like provided with the form but frequently determines the arrangement by considering the balance between the remaining blank and characters desired to be entered on the way of writing. For example, in general, a person who fills in a form is apt to change the height of the baseline in order to skirt a character printed within a frame or change the line on the way in order to include all characters desired to be written within the frame. As a result of that, the handwritten characters described within a frame of an entry field and the like are separated into a plurality of character blocks due to the irregular line change or the shift in the baseline. However, for example, it is desirable to handle handwritten characters entered for a specific item, such as "Address entry field" as a single continuous character string originally. The reason is that in a case where the OCR processing is performed for character blocks separated into sub blocks due to the irregular line change or the shift in the baseline, the above-described language model function that follows a reading order, such as from left to right, does not function properly, and therefore, there is a possibility that the character recognition accuracy will deteriorate. Then, it is not possible for Japanese Patent Laid-Open No. H8-44819 and Japanese Patent Laid-Open No. 2014-228953 described above to cope with a discontinuous character string caused by the characteristic of a person at the time of handwriting as described above.

SUMMARY OF THE INVENTION

The present invention has been made in view of the above-described situation and an object is to improve the character recognition accuracy of handwritten characters that are described discontinuously despite that they are originally continuous.

The information processing apparatus according to the present disclosure is an information processing apparatus for obtaining character information on a handwritten character from a document image obtained by scanning a document, the apparatus comprising: a memory that stores a program; and a processor that executes the program to perform: separating a first image area corresponding to the handwritten character from the document image; extracting a character block including characters in proximity to one another and having a common baseline from the separated first image area; and generating, in a case where a plurality of character blocks is extracted from the first image area, a single character block by combining character blocks based on a position relationship of the plurality of character blocks.

Further features of the present disclosure will become apparent from the following description of exemplary embodiments with reference to the attached drawings.

BRIEF DESCRIPTION OF THE DRAWINGS

FIG. 9A to FIG. 9C are each a diagram showing an example of a response;

FIG. 10 is a diagram showing an example of a Storage Saving screen;

FIG. 11 is a diagram showing an example of a File Name Setting screen;

FIG. 13A to FIG. 13C are each an explanatory diagram of handwritten character separation processing;

FIG. 16 is a diagram showing an example of an entry area in an original image;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

System Configuration

Figure 1:
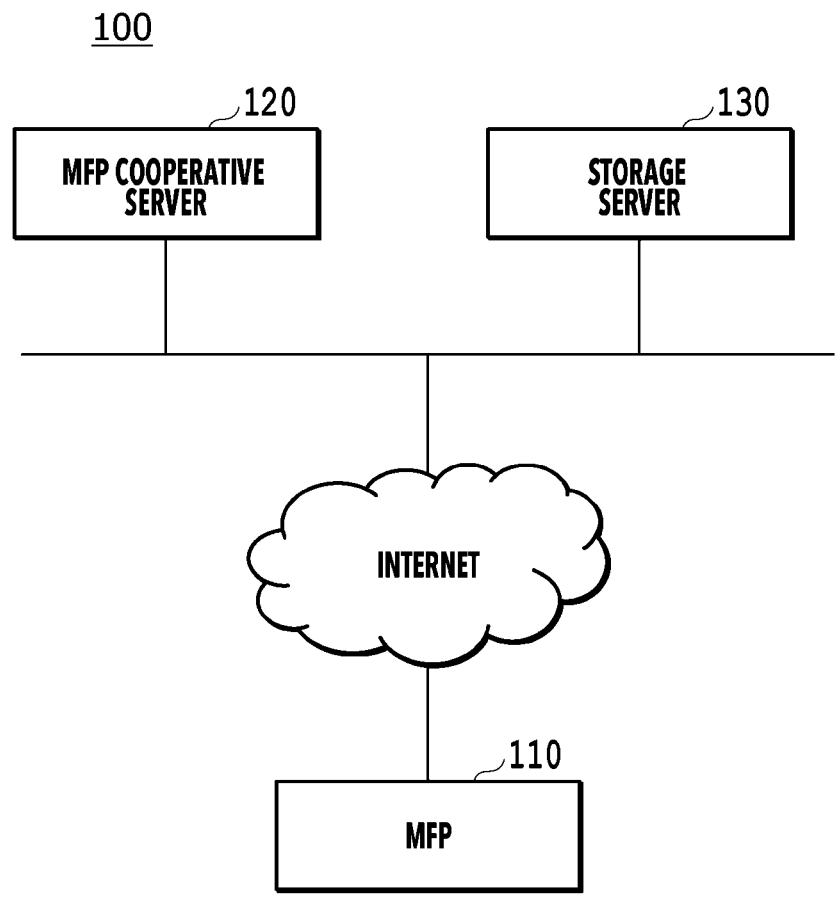
FIG. 1 is a diagram showing a general configuration of an image processing system.

FIG. 1 is a diagram showing the entire configuration of an image processing system according to the present embodiment. The image processing system includes an MFP (Multifunction Peripheral) 110 and server apparatuses 120 and 130 that provide cloud services on the internet. The MFP 110 is connected with the server apparatuses 120 and 130 via the internet so as to be capable of communication.

The MFP 110 is an example of an information processing apparatus having the scan function. The MFP 110 is a multifunction peripheral having a plurality of functions, such as the print function and the BOX store function, in addition to the scan function. Both the server apparatuses 120 and 130 are each an example of an information processing apparatus providing cloud services. The server apparatus 120 of the present embodiment provides cloud services to perform an image analysis for a scanned image received from the MFP 110, transfer a request from the MFP 110 to the server apparatus 130 providing other services, and so on. In the following, the cloud service provided by the server apparatus 120 is called "MFP cooperative service". The server apparatus 130 provides cloud services (hereinafter, called "storage services") to store a file that is sent via the internet, provide a stored file in response to a request from a web browser, such as a mobile terminal (not shown schematically), and so on. In the present embodiment, the server apparatus 120 that provides the MFP cooperative service is called "MFP cooperative server" and the server apparatus 130 that provides the storage service is called "storage server".

The configuration of an image processing system 100 shown in FIG. 1 is an example and the configuration is not limited to this. For example, it may also be possible for the MFP 110 to have the functions of the MFP cooperative server 120 as well. Further, the MFP cooperative server 120 may be connected with the MFP 110 via a LAN (Local Area Network), not via the internet. Furthermore, it may also be possible to apply the present embodiment to a scene in which a scanned image of a document is transmitted by being attached to a mail by replacing the storage server 130 with a mail server that performs a mail distribution service.

Hardware Configuration of MFP

Figure 2:
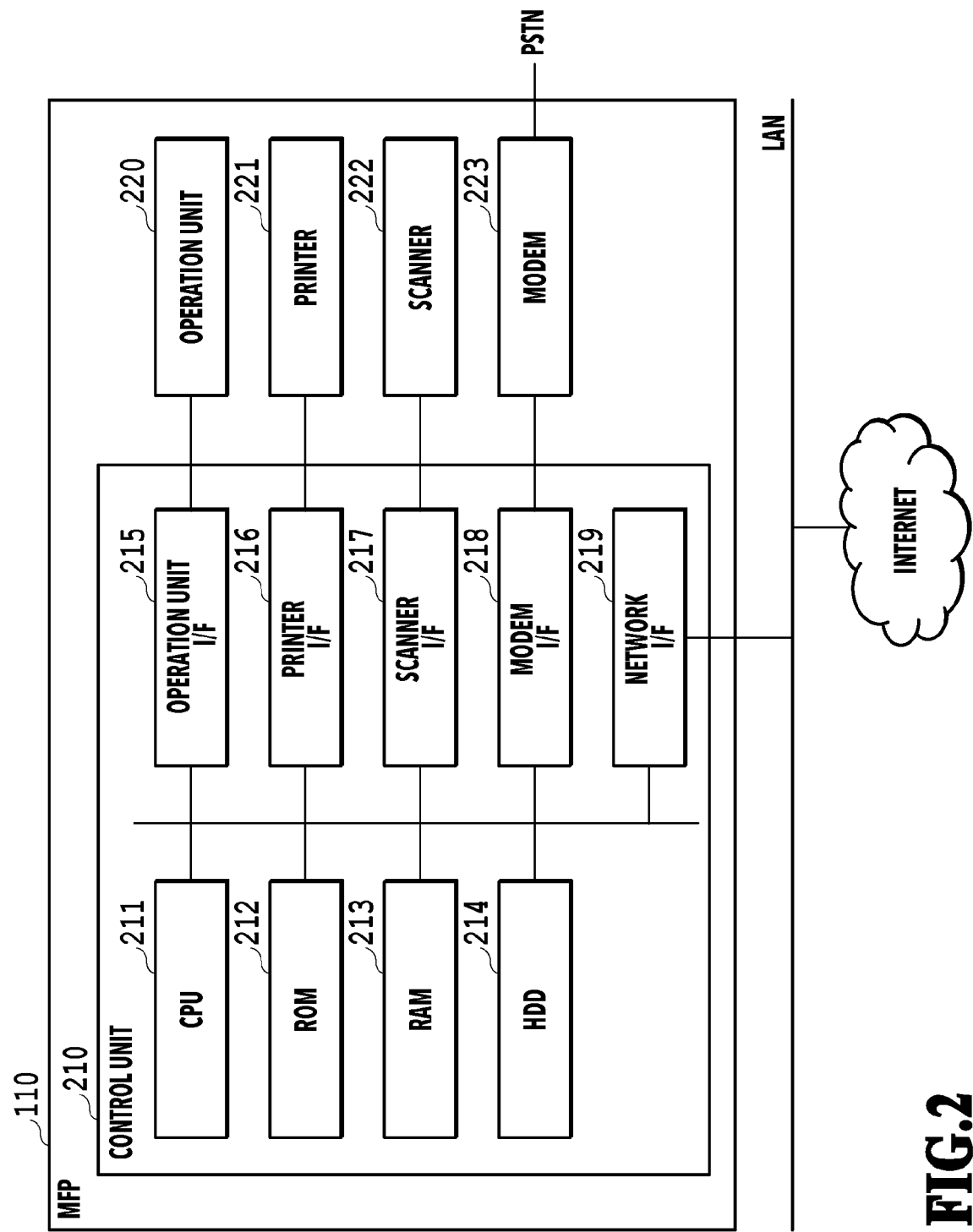
FIG. 2 is a block diagram showing a hardware configuration of an MFP.

FIG. 2 is a block diagram showing the hardware configuration of the MFP 110. The MFP 110 includes a control unit 210, an operation unit 220, a printer unit 221, a scanner unit 222, and a modem 223. The control unit 210 includes each of units 211 to 219 below and controls the operation of the entire MFP 110. The CPU 211 reads a variety of control programs (programs corresponding to various functions shown in a software configuration diagram, to be described later) stored in the ROM 212 and executes the programs. The RAM 213 is used as a temporary storage area, such as a main memory and a work area, of the CPU 211. In the present embodiment, the one CPU 211 performs each piece of processing shown in flowcharts, to be described later, by using the one memory (RAM 213 or HDD 214), but the present embodiment is not limited to this. For example, it may also be possible to perform each piece of processing by causing a plurality of CPUs and a plurality of RAMs or HDDs to cooperate with one another. The HDD 214 is a large-capacity storage unit configured to store image data and various programs. The operation unit I/F 215 is an interface that connects the operation unit 220 and the control unit 210. The operation unit 220 is provided with a touch panel, a keyboard and the like and receives operations/inputs/instructions by a user. The touch operation to the touch panel includes the operation by a human finger and the operation by a touch pen. The printer OF 216 is an interface that connects the printer unit 221 and the control unit 210. Image data to be printed is transferred from the control unit 210 to the printer unit 221 via the printer I/F 216 and printed on a printing medium, such as paper. The scanner OF 217 is an interface that connects the scanner unit 222 and the control unit 210. The scanner unit 222 generates scanned image data by optically reading a document that is set on a document table or ADF (Auto Document Feeder), not shown schematically, and inputs the scanned image data to the control unit 210 via the scanner I/F 217. It is possible to print (copy and output) the scanned image data generated by the scanner unit 222 in the printer unit 221, store the data in the HDD 214, transmit the data to an external apparatus, such as the MFP cooperative server 120, as a file via a LAN, and so on. The modem I/F 218 is an interface that connects the modem 223 and the control unit 210. The modem 223 performs facsimile communication of image data with a facsimile device (not shown schematically) on the PSTN. The network I/F 219 is an interface that connects the control unit 210 (MFP 110) to a LAN. The MFP 110 transmits the scanned image data to the MFP cooperative server 120, receives various kinds of data from the MFP cooperative server 120, and so on by using the network I/F 219. The hardware configuration of the MFP 110 explained above is an example and the hardware configuration may be one that comprises another configuration as needed or may be one that does not have a part of the configuration.

Hardware Configuration of Server Apparatus

Figure 3:
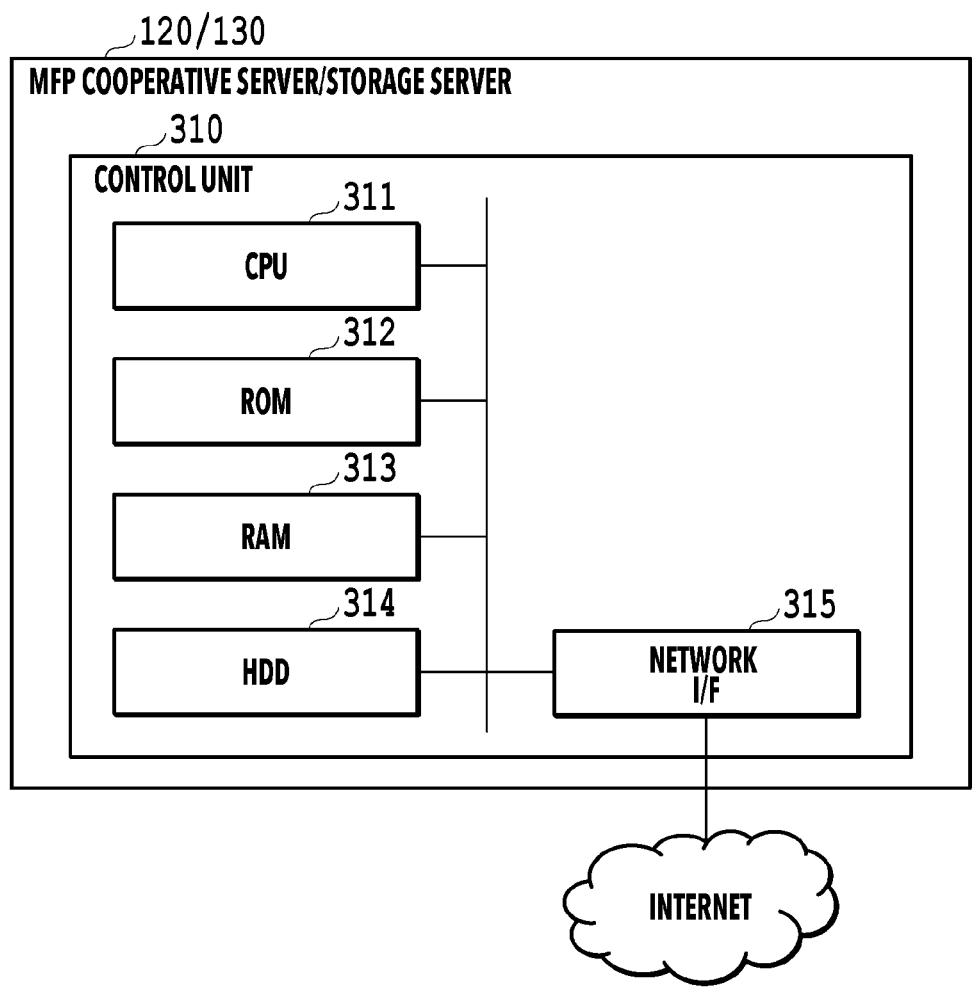
FIG. 3 is a block diagram showing a hardware configuration of an MFP cooperative server and a storage server.

FIG. 3 is a block diagram showing the hardware configuration of the MFP cooperative server 120 and the storage server 130. The MFP cooperative server 120 and the storage server 130 have the common hardware configuration and include a CPU 311, a ROM 312, a RAM 313, an HDD 314, and a network I/F 315. The CPU 311 controls the entire operation by reading control programs stored in the ROM 312 and performing various kinds of processing. The RAM 313 is used as a temporary storage area, such as a main memory and a work area, of the CPU 311. The HDD 314 is a large-capacity storage unit configured to store image data and various programs. The network I/F 315 is an interface that connects a control unit 310 to the internet. The MFP cooperative server 120 and the storage server 130 receive requests for various kinds of processing from other apparatuses (MFP 110 and the like) via the network I/F 315 and return processing results in accordance with the requests.

Software Configuration of Image Processing System

Figure 4:
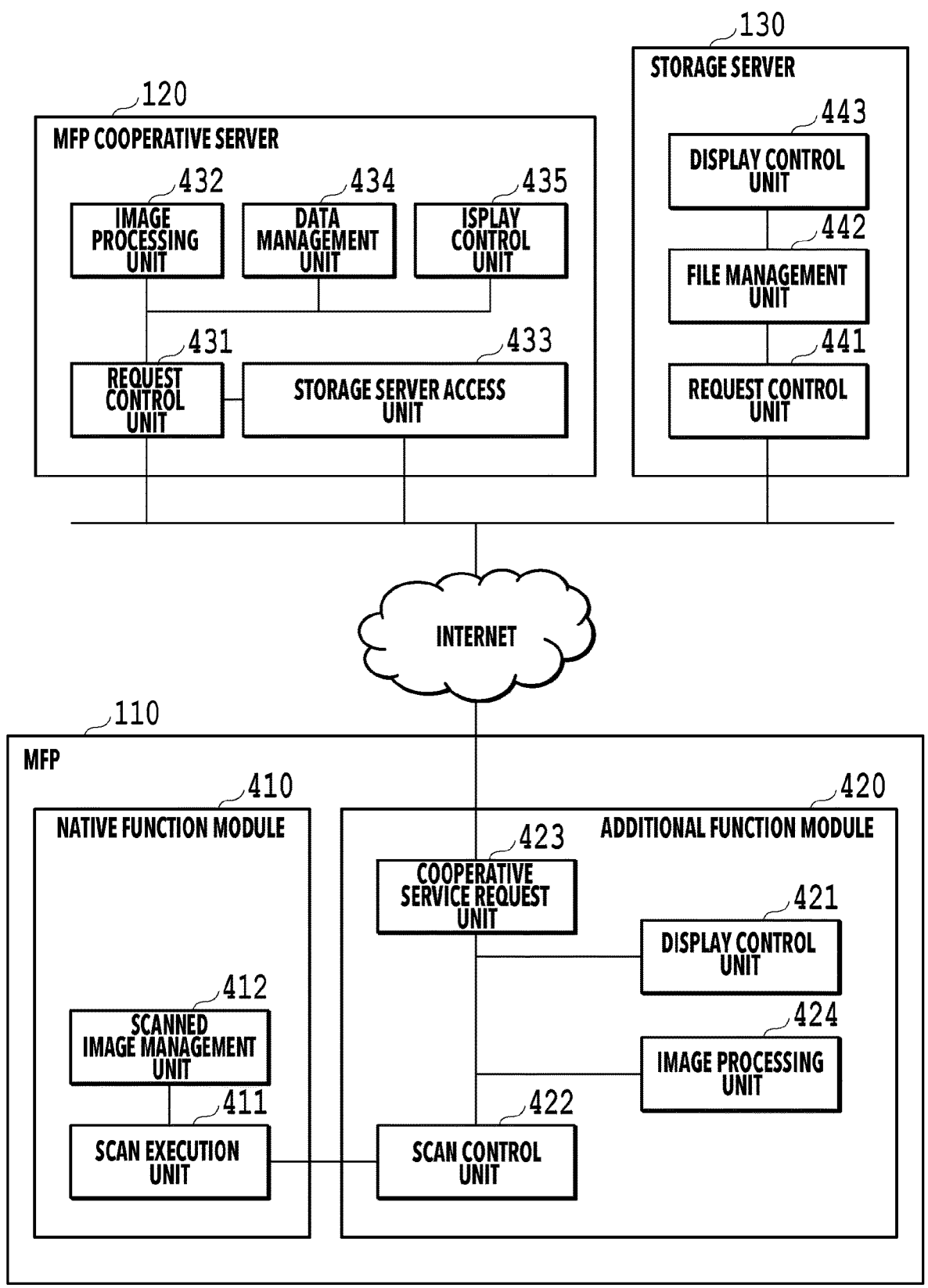
FIG. 4 is a block diagram showing a software configuration of the image processing system.

FIG. 4 is a block diagram showing the software configuration of the image processing system 100 according to the present embodiment. In the following, the software configuration corresponding to the role of each of the MFP 110, the MFP cooperative server 120, and the storage server 130 configuring the image processing system 100 is explained in order. In the following, explanation is given by narrowing the various functions of each apparatus to the functions relating to the processing from computerizing (filing) a document by performing a scan until storing it in the storage server 130.

Software Configuration of MFP

The function modules of the MFP 110 are roughly divided into two modules, that is, a native function module 410 and an additional function module 420. While the native function module 410 is an application provided as a standard one in the MFP 110, the additional function module 420 is an application that is installed additionally in the MFP 110. The additional function module 420 is an application based on Java (registered trademark) and it is possible to easily implement the addition of a function to the MFP 110. In the MFP 110, another additional application, not shown schematically, may be installed.

The native function module 410 has a scan execution unit 411 and a scanned image management unit 412. Further, the additional function module 420 has a display control unit 421, a scan control unit 422, a cooperative service request unit 423, and an image processing unit 424.

The display control unit 421 displays a user interface screen (UI screen) for receiving various user operations on a touch panel of the operation unit 220. The various user operations include, for example, inputting of login authentication information for accessing the MFP cooperative server 120, scan setting, giving instructions to start a scan, file name setting, giving instructions to store a file and the like.

The scan control unit 422 gives instructions to perform scan processing to the scan execution unit 411 along with scan setting information in accordance with the user operation (for example, pressing down of "Start scan" button) performed on the UI screen. The scan execution unit 411 causes the scanner unit 240 to perform the document reading operation via the scanner I/F 217 and generates scanned image data in accordance with the instructions to perform scan processing from the scan control unit 422. The generated scanned image data is stored in the HDD 214 by the scanned image management unit 412. At this time, the scan control unit 422 is notified of information on a scanned image identifier uniquely indicating the stored scanned image data. The scanned image identifier is a number, symbol, alphabet and the like for uniquely identifying the image scanned in the MFP 110. The scan control unit 422 obtains, for example, the scanned image data that is the target to be filed from the scanned image management unit 412 by using the above-described scanned image identifier. Then, the scan control unit 422 instructs the cooperative service request unit 423 to make a request for processing necessary to file the scanned image data to the MFP cooperative server 120.

The cooperative service request unit 423 makes requests for various kinds of processing to the MFP cooperative server 120, receives responses thereto, and so on. The various kinds of processing include, for example, login authentication, scanned image analysis, transmission of scanned image data and the like. For transmission and reception with the MFP cooperative server 120, the communication protocol, such as REST and SOAP, is used.

The image processing unit 424 generates an image to be used on the UI screen that is displayed by the display control unit 421 by performing predetermined image processing for the scanned image data. Details of the predetermined image processing will be described later.

It may also be possible for an apparatus (client PC and the like, not shown schematically) different from the MFP 110 to comprise the above-described additional function module 420. That is, the system configuration may be one in which the client PC makes an analysis request for the scanned image obtained by the MFP 110, performs file name setting based on the analysis results, and so on.

Software Configuration of Server Apparatus

First, the software configuration of the MFP cooperative server 120 is explained. The MFP cooperative server 120 has a request control unit 431, an image processing unit 432, a storage server access unit 433, a data management unit 434, and a display control unit 435. The request control unit 431 stands by in the state of being capable of receiving a request from an external apparatus and instructs the image processing unit 432, the storage server access unit 433, and the data management unit 434 to perform predetermined processing in accordance with received request contents. The image processing unit 432 performs image modification processing, such as rotation and inclination correction, in addition to analysis processing, such as character area detection processing and character recognition processing (OCR processing), for the scanned image data that is sent from the MFP 110. In the present embodiment, explanation is given by taking a membership application form including a hand-written field as an example of a processing-target document. The storage server access unit 433 makes a request for processing to the storage server 130. The cloud service has made public a variety of interfaces for storing a file in the storage server, obtaining a stored file, and so on by using the protocol, such as REST and SOAP. The storage server access unit 433 makes a request to the storage server 130 by using the interface having been made public. The data management unit 434 stores and manages user information, image analysis results, various kinds of setting data and the like, which are managed in the MFP cooperative server 120. The display control unit 435 receives a request from a web browser running on a PC or a mobile terminal (none of which is shown schematically) connected via the internet and returns screen configuration information (HTML, CSS and the like) necessary for the screen display. It is possible for a user to check the registered user information, change the scan setting and so on via the screen that is displayed on the web browser.

Next, the software configuration of the storage server 130 is explained. The storage server 130 has a request control unit 441, a file arrangement unit 442, and a display control unit 443. The request control unit 441 stands by in the state of being capable of receiving a request from an external apparatus and in the present embodiment, instructs the file arrangement unit 442 to store a received file and read a stored file in response to a request from the MFP cooperative server 120. Then, the request control unit 441 returns a response in accordance with the request to the MFP cooperative server 120. The display control unit 443 receives a request from a web browser running on a PC or a mobile terminal (none of which is shown schematically) connected via the internet and returns screen configuration information (HTML, CSS and the like) necessary for the screen display. It is possible for a user to check and obtain a stored file via the screen that is displayed on the web browser.

Flow of Processing of Entire Image Processing System

Figure 5B:
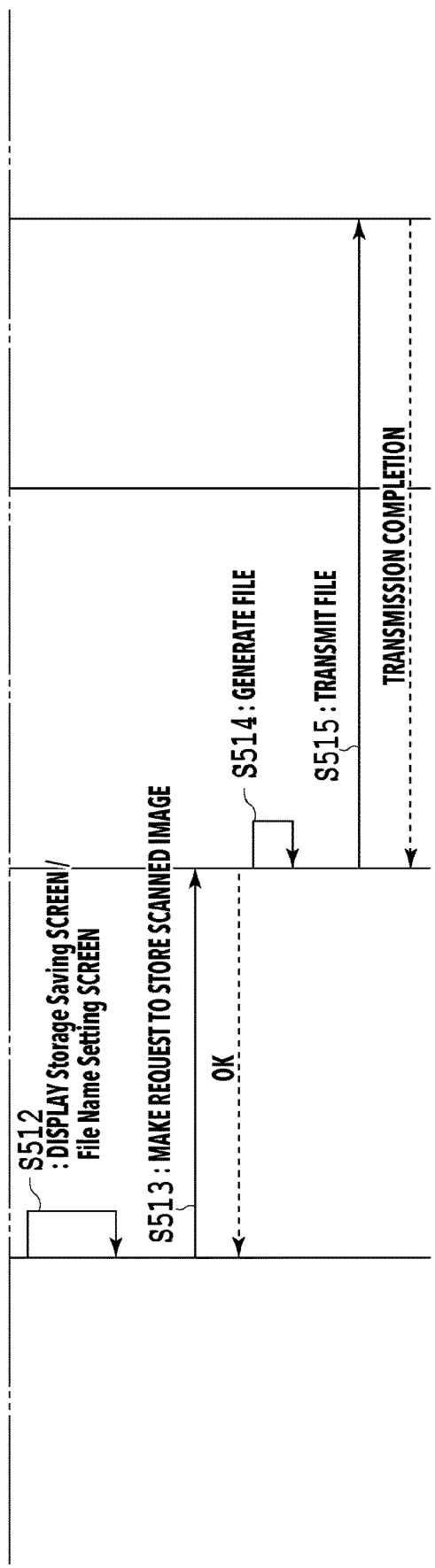
FIG. 5 is a diagram showing a relationship between FIGS. 5A and 5B, and FIGS. 5A and 5B are sequence diagrams showing a flow of processing of the entire image processing system.
Figure 6:
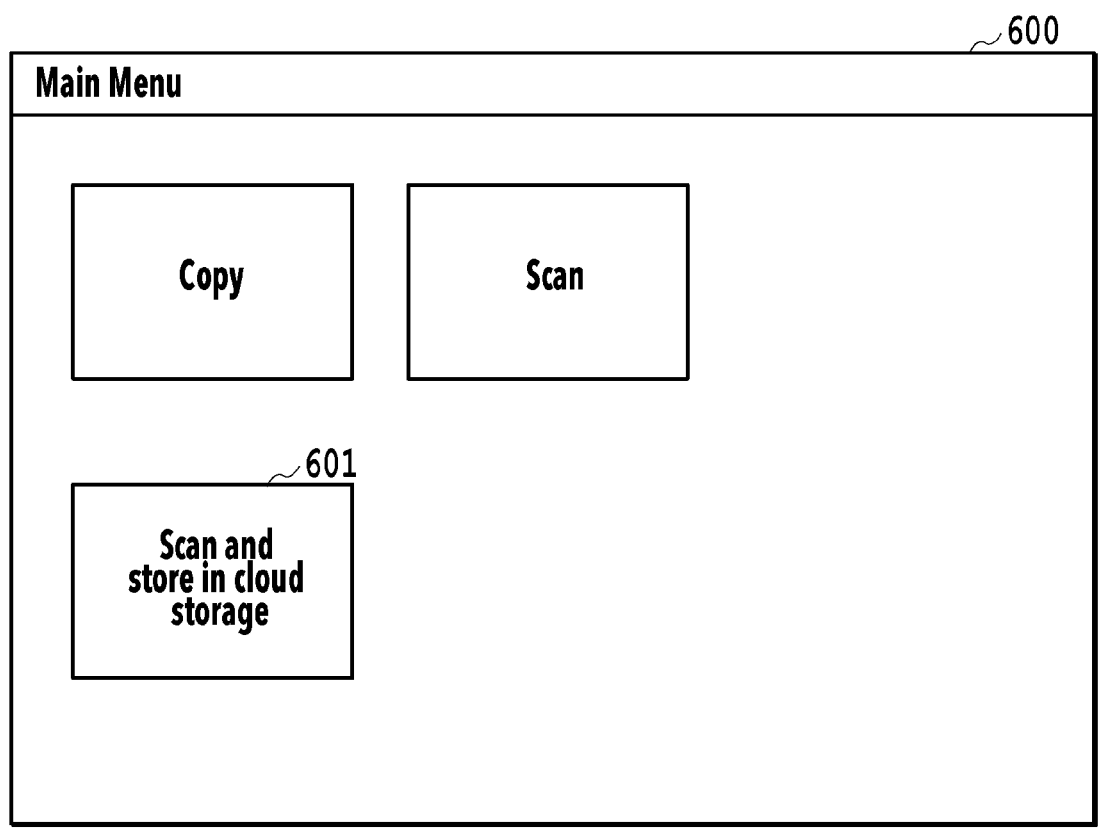
FIG. 6 is a diagram showing an example of a main screen.

FIGS. 5A and 5B are sequence diagrams showing a flow of processing among the apparatuses in a case where a document is scanned in the MFP 110 and the obtained document image is filed and stored in the storage server. FIG. 6 is a diagram showing an example of a UI screen of Main Menu (hereinafter, described as "main screen") that is displayed at the time of the activation of the MFP 110. In a case where a document is filed by performing a scan and a dedicated application necessary to make use of the cloud storage service is installed in the MFP 110, a "Scan and store in cloud storage" button 601 is displayed on a main screen 600. Then, in a case where a user presses down the "Scan and store in cloud storage" button 601 among the menu buttons displayed within the main screen 600, the series of processing shown in the sequence diagrams in FIGS. 5A and 5B starts. The sequence diagram in FIGS. 5A and 5B explains a case where a file name that is attached at the time of a scanned image being filed is set, but it is possible to apply the sequence diagrams in FIGS. 5A and 5B to properties in general, such as a folder path and metadata, in addition to a file name.

In the following, along the sequence diagrams in FIGS. 5A and 5B, the operations among the apparatuses are explained in a time series. In the following explanation, symbol "S" represents a step.

Figure 7:
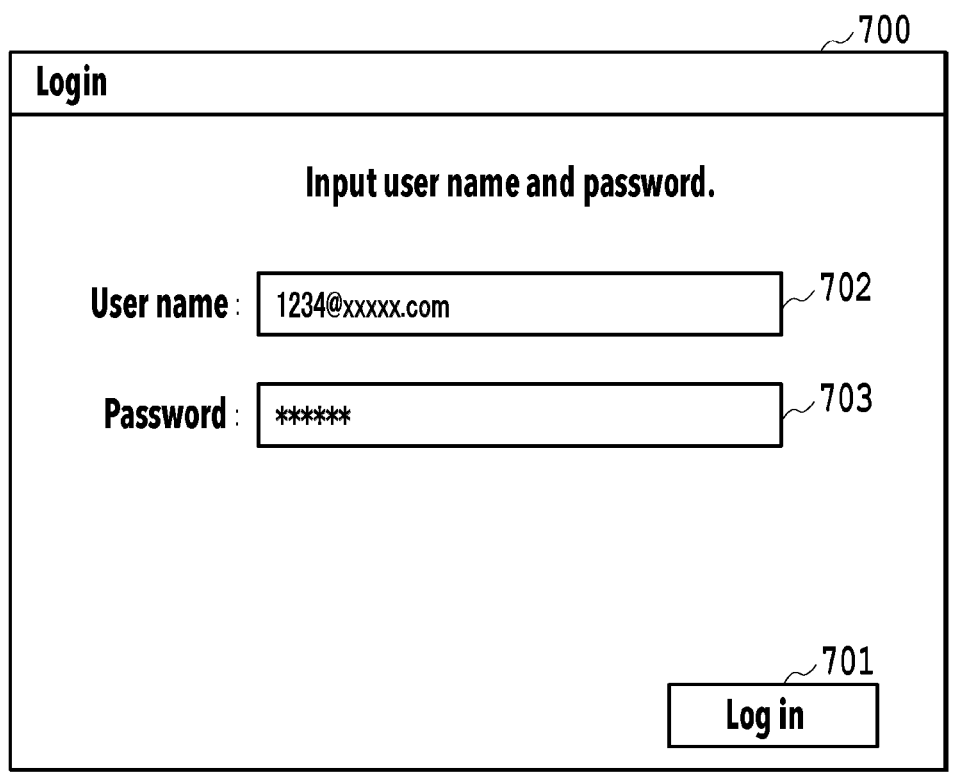
FIG. 7 is a diagram showing an example of a Login screen.

The MFP 110 displays a UI screen (hereinafter, described as "Login screen") on which to input information on login authentication for accessing the MFP cooperative server 120 on the operation unit 220 (S501). FIG. 7 shows an example of a Login screen. In a case where a user inputs a user ID and a password, which are registered in advance, in input fields 702 and 703, respectively, on a Login screen 700 and presses down a "Log in" button 701, a request for login authentication is transmitted to the MFP cooperative server 120 (S502).

The MFP cooperative server 120 having received the request for login authentication performs authentication processing by using the user ID and the password included in the request (S503). In a case where it is checked that the user is a genuine user by the results of the authentication processing, the MFP cooperative server 120 returns an access token to the MFP 110. After this, by sending this access token together at the time of the MFP 110 making various requests to the MFP cooperative server 120, a login user is specified. In the present embodiment, it is assumed that at the same time the login to the MFP cooperative server 120 is completed, the login to the storage server 130 is also completed. Because of this, a user performs in advance association between the user ID for making use of the MFP cooperative service and the user ID for making use of the storage service via a web browser or the like of a PC (not shown schematically) on the internet. Due to this, in a case where the login authentication to the MFP cooperative server 120 succeeds, the login authentication to the storage server 130 is also completed at the same time and it is possible to omit the operation to log in to the storage server 130. Then, it is made possible for the MFP cooperative server 120 to deal with a request relating to the storage service from a user who has logged in to the MFP cooperative server 120. Generally, it may be possible to perform the login authentication method by using a publicly known method (Basic authentication, Digest authentication, authentication using OAuth, and the like).

Figure 8:
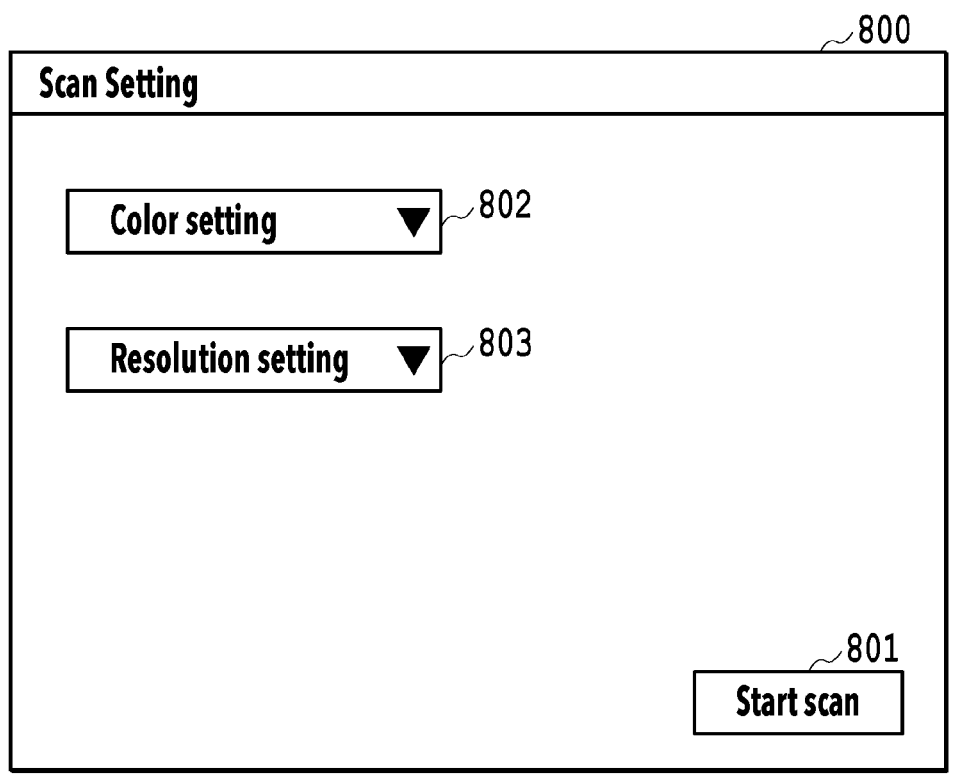
FIG. 8 is a diagram showing an example of a Scan Setting screen.

In a case where the login is completed, in the MFP 110, a UI screen for scan setting (hereinafter, described as "Scan Setting screen") is displayed on the operation unit 220 (S504). FIG. 8 shows an example of a Scan Setting screen. On a Scan Setting screen 800, a "Start scan" button 801, a Color setting field 802, and a Resolution setting field 803 exist. The "Start scan" button 801 is a button to give instructions to start scan processing for a document (in the present embodiment, a membership application form with a handwritten entry field is supposed) set on a document table. In the Color setting field 802, the color mode at the time of scan is set. For example, it is possible to specify one of alternatives, such as full color and monochrome. In the Resolution setting field 803, the resolution at the time of scan is set. For example, it is possible to specify one of alternatives, such as 600 dpi and 1,200 dpi. The color mode and the resolution are examples of the setting item and it is not necessary for all of these setting items to exist, or another setting item other than these may exist. Further, it may also be possible to limit the alternatives relating to the color mode and the resolution only to the setting values required in the storage service. A login user performs detailed condition setting as to the scan processing via the Scan Setting screen 800 such as this. In a case where a login user having completed the scan setting sets a scan-target document on the document table of the MFP 110 and presses down the "Start scan" button 801, a scan is performed (S505). Due to this, scanned image data obtained by computerizing a paper document is generated. After the scan is completed, the MFP 110 transmits the scanned image data obtained by the scan to the MFP cooperative server 120 along with an analysis request therefor (S506).

In the MFP cooperative server 120 having received the analysis request for a document image, the request control unit 431 instructs the image processing unit 432 to perform image analysis processing (S507). At that time, the request control unit 431 returns a request ID capable of uniquely specifying the received analysis request to the MFP 110. FIG. 9A shows an example of the request ID. On the other hand, the image processing unit 432 having received the instructions to perform image analysis processing performs image analysis processing for the document image relating to the analysis request (S508). In the image analysis processing of the present embodiment, first, for the characters existing within the document image, processing to separate the portion of the characters printed in advance (printed characters) and the portion of the characters entered by handwriting (handwritten characters) is performed. Next, for each of the printed character and the handwritten character within the document image, character block extraction processing is performed. Then, for the character block corresponding to the printed character (in the following, called "printed character block") of the character block of the "TEXT" attribute obtained by the block extraction processing, OCR processing is performed as it is. On the other hand, for the character block corresponding to the handwritten character (in the following, called "handwritten character block"), OCR processing is performed after performing processing to combine handwritten character blocks satisfying a predetermined condition. For the block extraction, it may be possible to apply an already-known method, for example, such as a method of detecting a rectangular area that is estimated to be a character from the image for which binarization has been performed with a certain threshold value.

While the above-described image analysis processing is being performed, the MFP 110 periodically (for example, about every several hundred milliseconds to several milliseconds) makes an inquiry about the processing situation to the MFP cooperative server 120 by using the above-described request ID (S509 to S509'). This inquiry is made repeatedly until a completion response (S510) of the image analysis processing from the MFP cooperative server 120 is obtained. Upon receipt of the inquiry about the processing situation, the MFP cooperative server 120 checks the progress situation of the image analysis processing corresponding to the request ID and in a case where the image analysis processing is not completed, the MFP cooperative server 120 returns a response (see FIG. 9B) indicating that the processing is being performed. Further, in a case where the analysis image analysis processing is completed, the MFP cooperative server 120 returns a response (see FIG. 9C) indicating completion. In "status" of this response, a character string indicating the current processing situation, specifically, in a case where the processing is being performed in the MFP cooperative server 120, "processing" is input and in a case where the processing is completed, "completed" is input. There is a case where a character string indicating another status is input, such as "failed" on a condition that the processing has failed. The response at the time of processing completion includes information relating to the analysis results of a document image, in addition to status information. Details of the image analysis processing in the MFP cooperative server 120 at S508 will be described separately later with reference to a flowchart.

After receiving the processing completion response, the MFP 110 makes a request for the image analysis results to the MFP cooperative server 120 by using URL indicating the storage destination of the image analysis results included in the response (S511). Upon receipt of the request, the request control unit 431 of the MFP cooperative server 120 returns the results information on the image analysis processing. This results information includes information obtained by associating the character recognition results of the character string included in the document image and the position information thereon to make a list.

Then, the series of processing (S504 to S511) from the display of the Scan Setting screen until the obtaining of the image analysis results is repeated the number of times corresponding to the number of filing-target documents.

Figure 11:
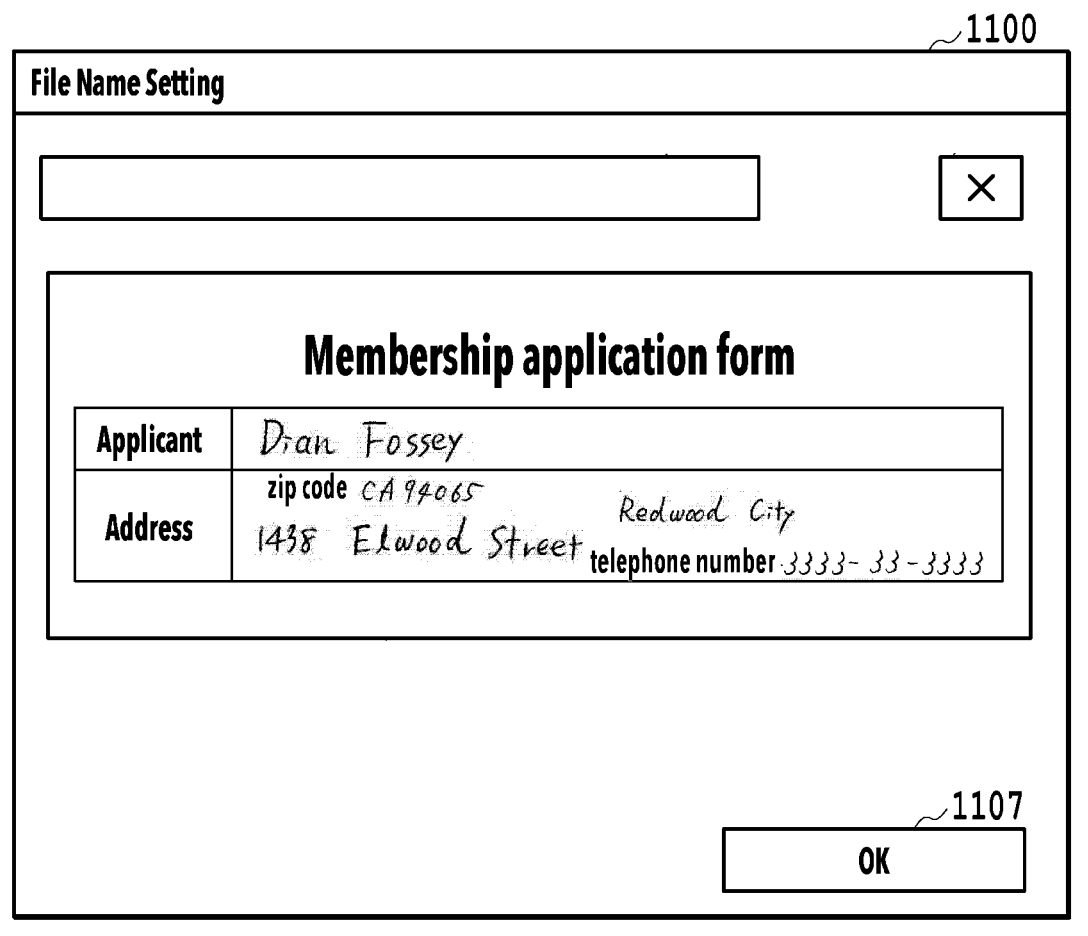

Then, the MFP 110 displays a UI screen (hereinafter, described as "Storage Saving screen") for setting a file name to the document image and saving it in the storage server 130 by using the results information on the image analysis processing. (S512). The file name is one kind of information that is set as a property (attribute) relating to scammed image data. FIG. 10 shows an example of a Storage Saving screen. On a Storage Saving screen 1000 in FIG. 10, a document list area 1001, a "Transmit" button 1002, an "Edit" button 1003, and a "Delete" button 1004 exist. In the document list area 1001, a list of scanned documents having been the image analysis targets is displayed in the list form. The "Transmit" button 1002 is a button for transmitting file data of a target document image to the storage server 130. By selecting an arbitrary application form from the scanned document list and pressing down the "Transmit" button 1002, file transmission is performed for the storage server 130 specified by "Transmission destination". In a case where the file transmission is completed normally, the information corresponding to one line relating to the membership application form is deleted from the scanned document list. The "Edit" button 1003 is a button for switching the UI screen to a File Name Setting screen 1100, to be described later. By selecting an arbitrary membership application form from the scanned document list and pressing down the "Edit" button 1003, the UI screen transits to a UI screen for setting a file name for the document image relating to the selection. The "Delete" button 1004 is a button for deleting an arbitrary membership application form. By selecting an arbitrary membership application form from the scanned document list and pressing down the "Delete" button 1004, the selected membership application form is deleted from the scanned document list. In a case where one arbitrary membership application form is selected from the scanned document list and following this, the operation event to press down the "Edit" button 1003 is detected, the Storage Saving screen 100 transits to the File Name Setting screen 1100 as shown in FIG. 11 in which the scanned image of the membership application form relating to the user selection is preview-displayed. Details of the file name setting using the File Name Setting screen 1100 will be described later. In a case where a user sets a file name on the File Name Setting screen 1100 in FIG. 11 and presses down an "OK" button 1107, the UI screen returns again to the Storage Saving screen 1000 shown in FIG. 10. Then, a user presses down the "Transmit" button 1002 within the Storage Saving screen 1000 in FIG. 10.

In response to the pressing down of the "Transmit" button 1002, the MFP 110 transmits a request to store the document image to the MFP cooperative server 120 along with the data of the document image relating to the user selection and the information on the file name that is set at the time of file transmission, and the like (S513). In the MFP cooperative server 120 having received the storage request, the request control unit 431 returns a response indicating that the storage request is received normally to the MFP 110 as well as starting the file generation processing. The MFP 110 having received the response terminates the processing and the state returns to the display state of the Scan Setting screen (S504). On the other hand, the MFP cooperative server 120 obtains the information on the file format from the scan setting registered in advance and files the document image in accordance with the file format (S514). At this time, to the generated file, the file name designated in the storage request is attached. The document image file thus generated is transmitted to the storage server 130 and stored therein (S515).

The above is the rough flow of the processing of the entire image processing system. In the sequence diagrams in FIGS. 5A and 5B, the contents are such that the MFP 110 performs transmission and reception with the MFP cooperative server 120, but the configuration may be one in which the obtaining of image analysis results, the display of the UI screen, and the like are performed by a client PC, not shown schematically.

Outline of Image Analysis Processing

Figure 12:
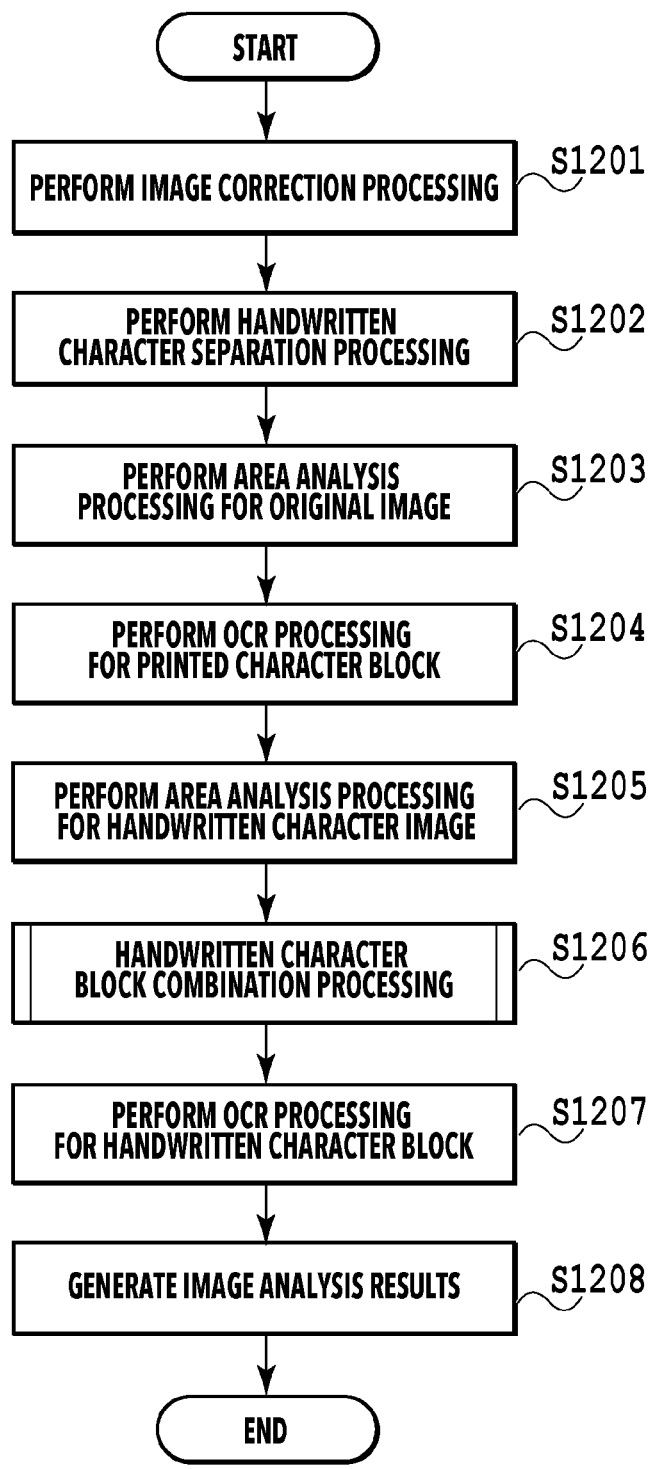
FIG. 12 is a flowchart showing a flow of image analysis processing.

FIG. 12 is a flowchart showing a flow of image analysis processing performed by the image processing unit 432 of the MFP cooperative server 120, which is performed at S508 described above.

First, at S1201, correction processing is performed for processing-target document image data. The correction processing that is performed here is preprocessing for processing that follows and for example, inclination correction processing or rotation correction processing for document image data. First, in the inclination correction processing, the inclination angle is detected from a document image and by rotating the image in the opposite direction by the amount corresponding to the detected inclination, the document image data whose inclination has been corrected is obtained. The inclination that is the target of the inclination correction occurs resulting from that the document was not read straightforwardly due to the friction of the roller within the document feeder at the time of reading by the scanner unit 222, that printing was not performed straightforwardly at the time of document printing, and the like. In the inclination detection, first, the object included within the document image is detected and object groups located side by side in the horizontal direction or the vertical direction are connected. Then, by obtaining how much the angle connecting the center positions of the connected objects inclines from the horizontal direction or the vertical direction, the inclination is found. The inclination detection is not limited to the above-described method. For example, it may also be possible to obtain the center coordinates of the object included within the document image and find the angle as the inclination, whose ratio that the center coordinate groups are located side by side in the horizontal direction or the vertical direction is the highest while rotating the center coordinate groups in units of 0.1 degrees. Next, the rotation correction processing to rotate the document image whose inclination has been corrected in units of 90 degrees so that the orientation of the character within the document is upright. Specifically, first, by taking the document image whose inclination has been corrected as a reference image, the image rotated by 90 degrees, the image rotated by 180 degrees, and the image rotated by 270 degrees are prepared. Then, simple OCR processing capable of fast processing is performed for each of the images rotated in units of 90 degrees and the image whose number of characters recognized with the degree of reliability higher than or equal to a predetermined value is the largest is obtained as the document image whose rotation correction has been performed. The method of rotation correction is not limited to that described above.

At next S1202, by taking the document image obtained at S1201, whose rotation correction has been performed, as an input document image, handwritten character separation processing is performed. FIG. 13A to FIG. 13C are explanatory diagrams of the handwritten character separation processing. FIG. 13A is an example of an input document image as a result of performing the correction processing at S1201 for the image obtained by scanning the membership application form. In a case where the handwritten character separation processing is performed for the input document image in FIG. 13A, the input document image is separated into a "handwritten character image" including only the handwritten character portion as shown in FIG. 13B and an "original image" including only the ruled lines and the printed characters and representing the state before the handwritten characters are entered as shown in FIG. 13C. Some techniques to separate the handwritten character image area from the document image are known, but in the present embodiment, the technique is mounted with the machine learning by a deep neural network. At this time, as the structure of the neural network, for example, the publicly known FCN (Fully Convolutional Networks) is applied. Further, as to the neural network for estimating the handwritten character image area, for example, the publicly known YOLO (You Only Look Once) is applied. It may also be possible to separate the handwritten character image area from the document image by, for example, detecting ruled lines included in the document image and specifying the internal area surrounded by the detected ruled lines as the area in which handwritten character is entered, other than the above-described method.

In a case where the handwritten character separation processing is completed, the processing of the original image (S1203 and S1204) is performed first and following that, the processing of the handwritten character image (S1205 to S1207) is performed. However, it may also be possible to perform part of the processing in parallel, such as starting the processing of the handwritten character image after the area analysis processing of the original image is completed.

Processing for Original Image

At S1203, the area analysis processing is performed by taking the original image obtained at S1202 as a target. Specifically, after classifying the original image into the foreground area and the background area, processing (also called "block selection processing") to divide the foreground area into blocks in accordance with the object attributes is performed. In this block selection processing, first, a query image in which each pixel is binarized into whiter or black is generated and a cluster of pixels surrounded by a black pixel contour is extracted by performing contour tracking for the query image. Then, for the cluster of black pixels whose area is larger than a predetermined area, the contour tracking is performed also for the white pixels inside the cluster and a cluster of white pixels is extracted and further, a cluster of black pixels is extracted recursively from the inside of the cluster of white pixels whose area is larger than or equal to a predetermined area. The cluster of black pixels thus obtained is taken as the foreground area and classified according to size and shape and classified into blocks in accordance with the object attributes. For example, the cluster whose aspect ratio is close to 1 and whose size is in a predetermined range is taken to be a pixel cluster corresponding to a character and further, the portion in which pixel clusters corresponding to characters are aligned in close proximity (portion in which the baseline of characters is the same and characters can be grouped) is taken as a character block having the attribute of "TEXT". Then, the flat pixel cluster is taken as a line block having the attribute of "LINE", the range occupied by black pixel clusters whose size is larger than or equal to a predetermined size and including rectangular white pixel clusters in a regularly arranged manner is taken as a table block having the attribute of "TABLE", and the range in which pixel clusters whose shapes are not uniform are interspersed is taken as a photo block having the attribute of "PHOTO". Further, an arbitrary shape pixel cluster, which corresponds to none of "TEXT", "LINE", "TABLE", and "PHOTO", is taken as a picture block having the attribute of "PICTURE". Among the blocks into which the area is divided for each object attribute, the character block classified into "TEXT" is extracted as the printed character block, which is taken as the target of printed-character OCR processing.

At S1204, the OCR processing is performed by taking all the printed character blocks extracted in the area analysis processing at S1203 as a target. Due to this, character recognition results corresponding to each printed character block are obtained. In a case where it is desired to extract only the handwritten characters described in a predetermined entry field, it is also possible to omit the OCR processing here for the printed character block.

Processing for Handwritten Character Image

Figure 14A:
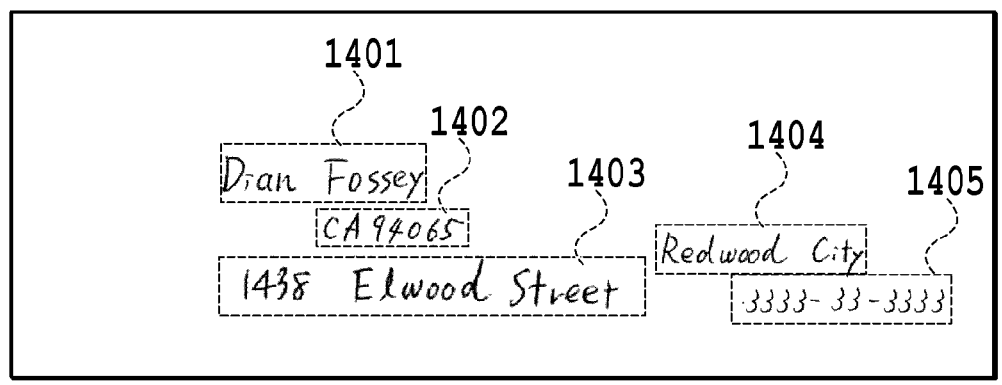
FIG. 14A is a diagram showing an example of results of area analysis processing for a handwritten character image and FIG. 14B is a diagram showing an example of results of handwritten character block combination processing.

At S1205, the area analysis processing is performed by taking the handwritten character image obtained at S1202 as a target. The nature, such as density and continuity of black pixels, is different between the printed character and the handwritten character. Consequently, by adjusting the parameters, such as the threshold value at the time of binarization and the threshold value at the time of continuity determination, to those for the handwritten character, it is possible to perform the area analysis processing suitable to the handwritten character. FIG. 14A shows results of the area analysis processing for the handwritten character image in FIG. 13B. As shown schematically, five handwritten character blocks 1401 to 1405 are obtained.

At S1206, processing to combine is performed as needed by taking all the handwritten character blocks obtained at S1205 as a target. By this combination processing, a plurality of handwritten character blocks, which should originally be extracted as one continuous block, is combined into one character block. Details of the handwritten character block combination processing will be described later.

At S1207, the OCR processing is performed by taking the handwritten character block for which the combination processing has been performed as a target. Due to this, character recognition results corresponding to each handwritten character block are obtained.

Lastly, at S1208, based on the character recognition results obtained at S1204 and S1207, image analysis results are generated. Specifically, processing to make a list is performed by associating each of the character recognition results of the printed character block and the character recognition results of the handwritten character block with the position information on the corresponding character block. In this manner, the character information is extracted from the document image.

The above is the contents of the image analysis processing at S508.

Details of Handwritten Character Block Combination Processing

Figure 15A:
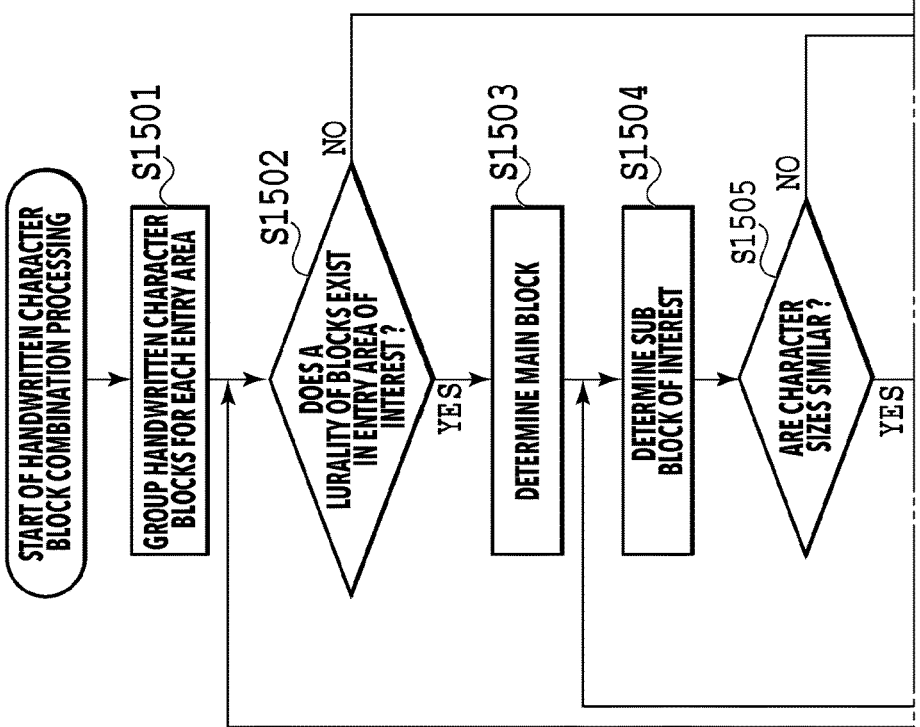
FIG. 15 is a diagram showing a relationship between FIGS. 15A and 15B, and FIGS. 15A and 15B are flowcharts showing details of the handwritten character block combination processing according to a first embodiment.
Figure 15B:
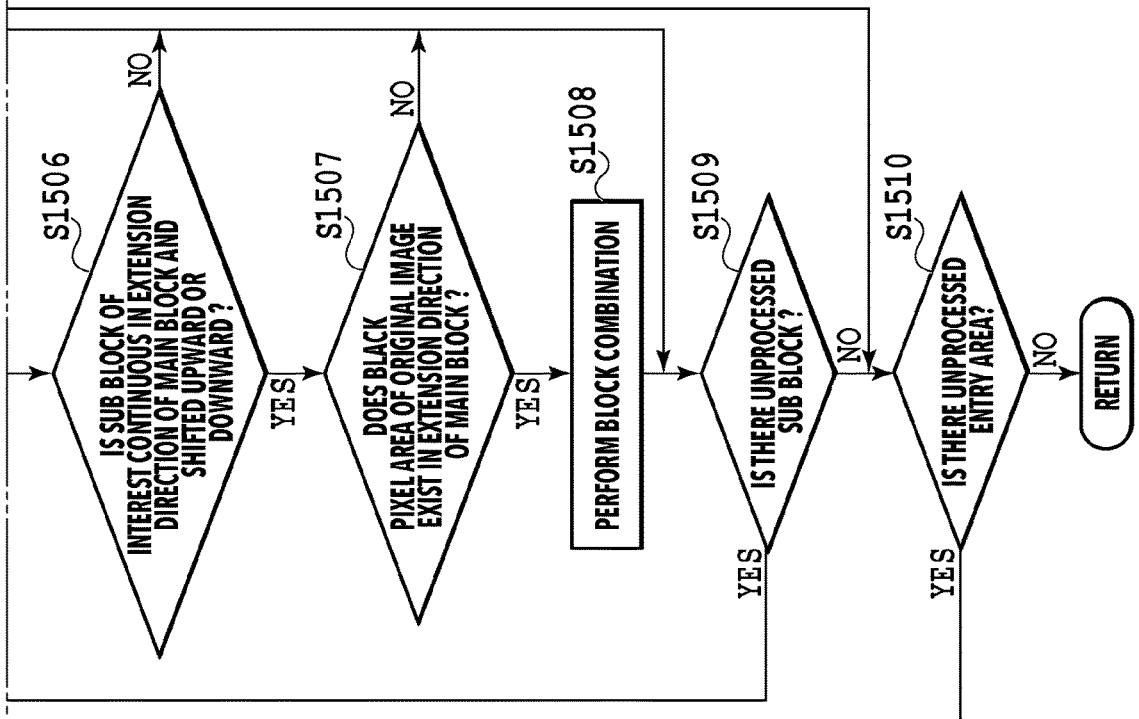

FIGS. 15A and 15B are flowcharts showing details of the handwritten character block combination processing according to the present embodiment. In the following, along the flow in FIGS. 15A and 15B, the combination processing for extracting the plurality of separated handwritten character blocks as shown in FIG. 14A as a single handwritten character block is explained in detail.

At S1501, grouping processing to group the handwritten character blocks obtained by the area analysis processing (S1205) described previously for each blank area in the original image is performed. In a case of the present embodiment, the area (cell area in table structure) surrounded by ruled lines, which are determined to be the line area "LINE" in the area analysis processing (S1203) for the original image described previously, corresponding to the entry field, such as "Applicant" and "Address", within the membership application form is the blank area. In the following, the blank area relating to the specific item for which it is supposed that handwritten characters are entered is called "entry area". FIG. 16 shows the two entry areas in the original image in FIG. 13C described previously by broken line rectangles 1601 and 1602. The specification of an entry area is not limited to the above-described method. For example, it may also be possible to specify the areas existing on the left and right sides of the character area "TEXT" as entry areas or to set an entry area based on a user input via a UI screen, not shown schematically. Further, it may also be possible to specify an entry area in a processing-target document image by using a trained model obtained by performing machine learning by a deep neural network by using the blank area corresponding to the entry field as training data for the document images in a variety of document formats.

Next S1502 to S1510 form loop processing for each entry area obtained by the grouping processing.

First, at S1502, whether a plurality of handwritten character blocks exists in the entry area of interest is determined. In a case where a plurality of handwritten character blocks exists within the entry area of interest, the processing advances to S1503. On the other hand, in a case where one handwritten character block exists or no handwritten character block exists within the entry area of interest, the processing advances to S1510. In the example shown in FIG. 16 described previously, as to the two entry areas 1601 and 1602, in the entry area 1601, only one handwritten character block exists, and therefore, the processing advances to S1510 and in the entry area 1602, four handwritten character blocks exist, and therefore, the processing advances to S1503. In the following, explanation is given by taking the processing in a case where the entry area 1602 is taken as the entry area of interest as a specific example.

At S1503, among a plurality of handwritten character blocks existing within the entry area of interest, a block (in the following, called "main block") forming a main character row is determined. For example, the handwritten character block existing at the starting position from which characters are written in the entry area is determined to be the main block. In a case of the horizontal writing format as shown in FIG. 13, the direction in which characters are written is from left to right and the starting position from which characters are written is the leftmost end, and therefore, it is sufficient to determine the handwritten character block located at the leftmost end as the main block. However, the main block determination method is not limited to this and it is also possible to determine the main block by using another parameter, for example, such as determining the longest block as the main block or determining the block whose size is the largest as the main block. In a case where the entry area 1602 shown in FIG. 16 is the entry area of interest, among the four handwritten character blocks 1402 to 1405, the handwritten character block 1403 whose starting position from which the character is written is located at the leftmost end and whose length is the longest is determined to be the main block. In a case of the vertical writing format, the direction in which characters are written is from top to bottom and the starting position from which characters are written is the uppermost end, and therefore, it is sufficient to determine the handwritten character block existing at the uppermost end to be the main block. Further, in a case of a language in which the direction in which characters are written from right to left, such as Arabic, the starting position from which characters are written is the rightmost end, and therefore, it is sufficient to determine the handwritten character located at the rightmost end to be the main block.

S1504 to S1509 form loop processing for each remaining handwritten character block (in the following, called "sub block") other than the main block determined at S1503 among the handwritten character blocks existing in the entry area of interest. By this loop processing, whether or not the main block and each remaining sub block can be combined is determined.

First, at S1504, among the remaining sub blocks, the sub block of interest is determined. At S1505 that follows, whether the character size of the determined sub block of interest is similar to the character size of the main block is determined. This check of the character size is performed for the purpose of excluding the sub block from the connection target, whose character size is largely different from that of the main block, because the possibility that they belong to different items or rows or the possibility that they are separated with a particular intention is strong. Consequently, it is sufficient to determine whether both character sizes are similar by, for example, taking the height of the main block as a reference and determining that both character sizes are similar (not largely different) in a case where the height of the sub block is, for example, in a range between 50% and 150% of the height of the main block. In a case where it is determined that the character size of the main block and the character size of the sub block of interest are similar as a result of the determination such as this, the processing advances to S1506 and in a case where it is determined that both character sizes are not similar (largely different), the processing skips the combination processing at S1508 and advances to S1509.

At S1506, whether the sub block of interest is continuous in the extension direction of the main block (direction in which the main block is extended toward the direction in which characters are written) and shifts upward or downward is determined. This check of the position relationship is performed because it is desirable to, in a case where it is estimated that a person who fills in the form starts to write characters in an entry field but on the way, he/she shifts the baseline upward or downward and continues writing, handle those characters as a continuous character string. Here, "being continuous in the extension direction of the main block" means that the leftmost end (x-coordinate of the position at which writing starts) of the sub block of interest matches with the rightmost end (x-coordinate of the position at which writing ends) of the main block. "Matching" at this time does not need to be perfect matching and for example, it may be possible to include a shift of about an amount corresponding to one character in an allowable range. In a case where this condition is satisfied, the processing advances to S1507 and in a case where this condition is not satisfied, the processing advances to S1509. Here, it is assumed that as the sub block of interest, the handwritten character block 1404 is selected in the specific example in FIG. 14A. The leftmost end position of the handwritten character block 1404 substantially matches (shift width in the x-direction is within the range of one character) with the rightmost end position of the handwritten character block 1403, which is the main block. Then, the handwritten character block 1404 is shifted in the upward direction with respect to the handwritten character block 1403, and therefore, determination results are "Yes" and the processing advances to next S1507.

At S1507, whether there exists a black pixel area (printed character) of the original image in the extension direction of the main block is determined. At the time of this determination, for example, it is not necessary for a printed character to exist at the position that perfectly matches with the main block in the horizontal direction and it may be possible to include, for example, a shift in the height direction (y-coordinate) of about an amount corresponding to one character in an allowable range. This printed character check of the original image is performed because of the following reason. First, in a case where it is estimated that the characters within the sub block of interest whose character size has been determined to be similar at S1506 are shifted upward or downward on the way in order to avoid the printed character portion within the original image and then entering is continued, it is appropriate to handle the characters as a continuous character string. On the other hand, in a case where the sub block of interest is shifted upward or downward despite that there is no printed character that should be skirted within the original document, it is estimated that the characters are characters entered by being shifted with another intension, and in this case, it is not appropriate to handle the characters as a continuous character string. Consequently, the condition such as this exists for determining whether the sub block of interest is shifted upward or downward for the purpose of skirting the printed character within the original image. In a case where this condition is satisfied, the processing advances to S1508 and in a case where this condition is not satisfied, the processing advances to S1509. Here, in the extension direction of the handwritten character block 1403, which is the main block, the black pixel area of the printed characters of "telephone number" exists, and therefore, the determination results are "Yes" and the processing advances to next S1508.

At S1508, processing to combine the sub block of interest that satisfies all the conditions at S1505 to S1057 with the main block is performed. Due to this, the handwritten character block (combined image) is generated, which is represented by a single image area combining the image area corresponding to the main block and the image area corresponding to the sub block of interest. Here, the three conditions are provided as the predetermined conditions at the time of determining whether to combine, but all the three conditions are not necessarily required. After the combination, the processing advances to S1509.

At S1509, whether there remains an unprocessed sub block within the entry area of interest is determined. In a case where there is an unprocessed block, the processing returns to S1504 and the processing is continued by taking the next sub block of interest as a target. On the other hand, in a case where the processing of all the sub blocks is completed, the processing advances to S1510.

At S1510, whether or not the above-described loop processing is completed for all the entry areas is determined. In a case where there is an unprocessed entry area, the processing returns to S1502 and the processing is continued by taking the next entry area as a target. On the other hand, in a case where the processing of all the entry areas is completed, this processing is terminated and the processing returns to the flow in FIG. 12.

Figure 14B:
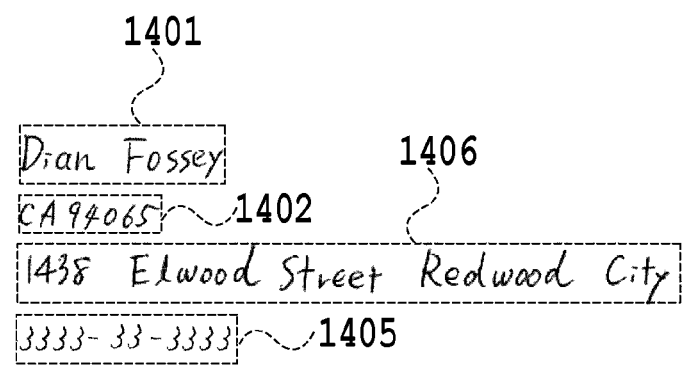

The above is the contents of the handwritten character block combination processing according to the present embodiment. FIG. 14B shows the results of performing the handwritten character block combination processing for the five handwritten character blocks 1401 to 1405 shown in FIG. 14A described above. It can be seen that the handwritten character blocks 1403 and 1404 are combined into one handwritten character block 1406. The two character strings of "1438 Elwood Street" and "Redwood City" corresponding to the two handwritten character blocks 1403 and 1404 combined in this example are character strings originally entered within a frame corresponding to one item of "Address". Because of this, for example, in a case where the OCR processing having the language model function described previously is performed, it is possible to handle the two character strings as one continuous character string entered under the common concept of address, and therefore, it is made easier to perform character recognition. As a result of that, it can be expected to reduce erroneous recognition compared to a case where the OCR processing is performed in a state where the two character strings are not combined and remain separate (in the state in FIG. 14A).

As above, according to the present embodiment, even in a case where handwritten characters entered in an entry field and the like are shifted upward or downward on the way from the entry position (baseline) in order to skirt a character printed in advance, it is possible to extract the handwritten characters as a single character block from a document image. As a result of that, it is possible to improve the character recognition accuracy in the OCR processing.

Second Embodiment

In the first embodiment, the aspect is explained in which in a case where a character block corresponding to handwritten characters is separated because a person who fills in a form shifts and enters characters on the way in order to skirt a character that is printed in advance within the entry area, those separated character blocks are combined in order to obtain a single character block. Next, an aspect is explained as a second embodiment in which in a case where handwritten characters that are originally continuous with the same baseline are separated because a person who fills in a form changes the line on the way so that all the characters are included in the entry area, those separated characters are combined in order to obtain a single character block. Explanation of the contents common to those of the first embodiment, such as the system configuration and the processing of the entire system, is omitted and in the following, handwritten character block combination processing, which is a different point, is explained.

Figure 17A:
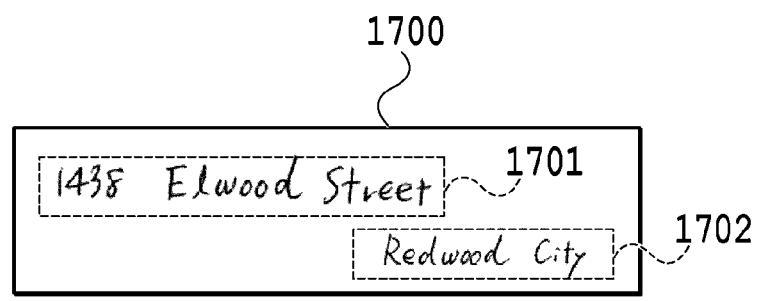
FIG. 17A is a diagram showing an example of results of area analysis processing for a handwritten character image and FIG. 17B is a diagram showing results of the handwritten character block combination processing.

FIG. 17A is an example of the results of the area analysis processing for the handwritten character image for explaining an application example of the present embodiment. In FIG. 17A, a solid-line rectangle 1700 indicates a frame indicating an entry area and broken-line rectangles 1701 and 1702 located therein indicate handwritten character blocks separated and detected. In a case of the example in FIG. 17A, the handwritten character image such as this is obtained by a person who fills in the form changing the line after entering characters up to "Street" and starting to write the rest from directly under "e" of "Street" so that all the characters are included within the entry area 1700. In the present embodiment, it is made possible to obtain a single handwritten character block by combining the handwritten character blocks separated by irregularly changing the line as described above.

Details of Handwritten Character Block Combination Processing

Figure 18B:
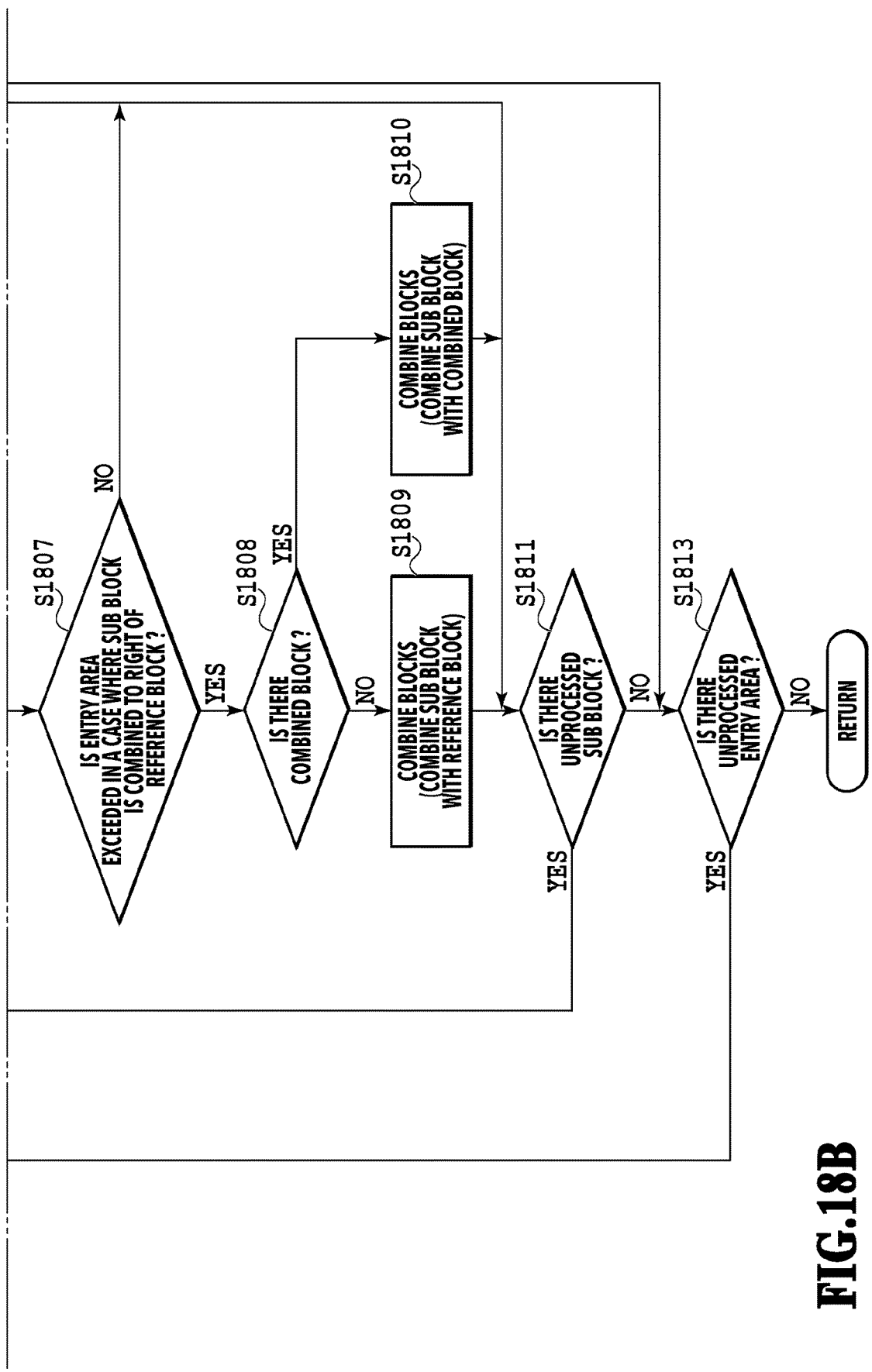
FIG. 18 is a diagram showing a relationship between FIGS. 18A and 18B, and FIGS. 18A and 18B are flowcharts showing results of handwritten character block combination processing according to a second embodiment.

FIGS. 18A and 18B are flowcharts showing details of the handwritten character block combination processing according to the present embodiment. In the following, along the flow in FIGS. 18A and 18B, the combination processing for extracting a plurality of separated handwritten character blocks as shown in FIG. 17A as a single handwritten character block is explained in detail.

At S1801, as at S1501 in the flow in FIG. 15A of the first embodiment, the processing to group the handwritten character blocks obtained by the area analysis processing (S1205) for each blank area in the original image is performed. Next S1802 to S1813 form loop processing for each entry area obtained by the grouping processing.

First, at S1802, as at S1502, whether a plurality of handwritten character blocks exists in the entry area of interest is determined. In a case where a plurality of handwritten character blocks exists within the entry area of interest, the processing advances to S1803. On the other hand, in a case where one handwritten character block exists or no handwritten character block exists within the entry area of interest, the processing advances to S1813. In the following, each piece of processing at S1803 and subsequent steps is explained by taking the processing as a specific example in a case where the above-described entry area 1700 is taken as the entry area of interest.

At S1803, among the plurality of handwritten character blocks existing within the entry area of interest, a main block is determined and further, the main block is set as an initial value of a reference block, which is a determination reference of whether or not subsequent combination is possible. Here, the handwritten character block 1701 within the entry area 1700 is determined to be the main block and further set as the initial value of the reference block.

S1804 to S1811 form loop processing for each remaining sub block other than the main block determined at S1803 among the handwritten character blocks existing in the entry area of interest. By this loop processing, whether or not it is possible to combine each remaining sub block and the reference block is determined.

At S1804, the sub block of interest is determined among the remaining sub blocks. Here, as the sub block of interest, the handwritten character block 1702 is selected. At S1805 that follows, whether the character size is similar to the character size of the reference block is determined for the determined sub block of interest. This check of the character size is performed for the same purpose as that at S1505. In a case where it is determined that the character size of the reference block and the character size of the sub block of interest are similar as a result of the determination, the processing advances to S1806 and in a case where it is determined that they are not similar, the processing advances to S1811.

At S1806, whether the sub block of interest exists at the line change position of the reference block is determined. This check of the position relationship is performed for checking whether it is possible to determine that the movement is due to the line change. Here, in a case where the horizontal writing of Japanese is premised, on a condition that the x-coordinate of the leftmost end of the sub block of interest is within the range from the leftmost end to the rightmost end of the reference block and the uppermost end of the sub block of interest is under the lowermost end of the reference block, it is determined that the sub block of interest "exists at the line change position of the reference block". At this time, as at S1506, it may be possible to include a shift of, for example, about an amount corresponding to one character in the horizontal direction (x-direction) in the allowable range. In a case where it can be determined that the movement of the line is due to the line change according to results of the determination, the processing advances to S1807 and in other cases, the processing advances to S1811. Here, the leftmost end of the handwritten character block 1702 is located at the position somewhat more leftward than the rightmost end of the handwritten character block 1701, which is the reference block. Then, the uppermost end of the handwritten character block 1702 is under the lowermost end of the handwritten character block 1701. Consequently, the determination results are "Yes" and the processing advances to next S1807.

At S1807, whether the rightmost end of the block after combination exceeds the entry area of interest in a case where the sub block is combined to the right side of the reference block is determined. This combination check is performed for determining whether the line change of the sub block of interest is performed in order to avoid the characters bulging out from the entry area in a case where the characters of the sub block are written from the right side of the reference block. In a case where the determination results indicate that the rightmost end of the block after combination exceeds the entry area, the processing advances to S1808 and in other cases, the processing advances to S1811. Here, in a case where the handwritten character block 1702 is added to the right side of the handwritten character block 1701, which is the reference block, the rightmost end of the block after combination bulges out from the entry area 1700. Consequently, the determination results are "Yes", and therefore, the processing advances to S1808.

At S1808, whether there is a combined block is determined. In a case where the combination processing is not performed even once and no combined block exists, the processing advances to S1809. On the other hand, in a case where an already combined block exists, the processing advances to S1810.

At S1809, the processing to combine the sub block of interest with the reference block is performed. By this processing, the handwritten character block 1702 is combined to the right side of the handwritten character block 1701, which is the reference block. The block after combination (combined image) is stored temporarily in the RAM 313 as a combined block.

At S1810, the combined block is read and the processing to combine the sub block of interest with the read combined block is performed. In a case where a plurality of handwritten character blocks whose line is changed irregularly exists, although those do not exist in the above-described example, the combination is repeated by this processing.

At S1811, whether an unprocessed sub block remains within the entry area of interest is determined. In a case where there is an unprocessed sub block, first, the processing advances to S1812 and the reference block is updates. Updating of the reference block is processing to set the handwritten character block, which is the sub block of interest, as the next reference block. Then, after updating, the processing returns to S1804 and the same processing is continued by taking the next sub block of interest as a target. Due to this, it is made possible to cope with a case where the line change has been performed a plurality of times. On the other hand, in a case where the processing for all the sub blocks is completed, the processing advances to S1813.

At S1813, whether or not the above-described loop processing is completed for all the entry areas is determined. In a case where there is an unprocessed entry area, the processing returns to S1802 and the processing is continued by taking the next entry area as a target. On the other hand, in a case where the processing is completed for all the entry areas, this processing is terminated and the processing returns to the flow in FIG. 12.

Figure 17B:
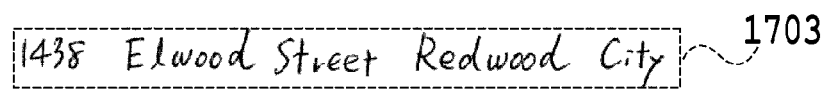

The above is the contents of the handwritten character block combination processing according to the present embodiment. As the predetermined conditions at the time of determining whether to combine, the three conditions are provided in the present embodiment as well, but all of the three conditions are not necessarily required. FIG. 17B shows a combined handwritten character block 1703 obtained by combining the two handwritten character blocks 1701 and 1702 shown in FIG. 17A. As in the first embodiment, the two character strings corresponding to the two handwritten character blocks that are combined are originally a single continuous character string that is entered under the common concept, and therefore, it can be expected to reduce erroneous recognition in the OCR processing by combination.

As above, according to the present embodiment, even in a case where the line of handwritten characters is changed irregularly in order to include all the handwritten characters within a predetermined area, such as an entry field, it is possible to extract the separated handwritten characters from the document image as a single continuous character block. As a result of that, it is possible to improve the recognition accuracy of the OCR processing.

Third Embodiment

In the first embodiment, the aspect is explained in which handwritten character blocks separated by a shift in the entry position (baseline) are combined into a single handwritten character block by the combination processing and in the second embodiment, the aspect is explained in which handwritten character blocks separated by the line change are combined into a single handwritten character block by the combination processing. Next, an aspect is explained as a third embodiment in which handwritten character blocks separated by a compound factor of those are combined. Explanation of the contents common to those of the first and second embodiments, such as the system configuration and the flow of the processing of the entire system, is omitted and in the following, the handwritten character block combination processing, which is a different point, is explained.

Figure 19A:
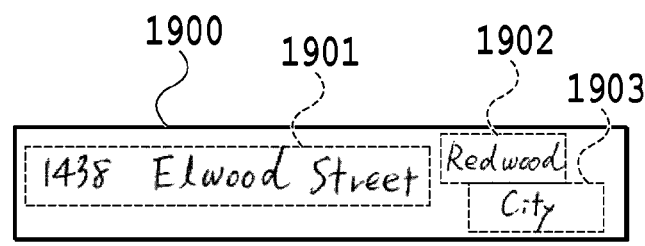
FIG. 19A is a diagram showing an example of results of area analysis processing for a handwritten character image and FIG. 19B is a diagram showing an example of results of the handwritten character block combination processing.

FIG. 19A is an example of the results of the area analysis processing for the handwritten character image for explaining an application example of the present embodiment. In FIG. 19A, a solid-line rectangle 1900 indicates an entry area and broken-line rectangles 1901 to 1903 located therein indicate handwritten character blocks detected and separated. In a case of the example in FIG. 19A, the handwritten character image is such as this because a person who fills in the form shifts the entry position (baseline) in the upward direction in the stage where he/she has entered "Street" in order to include all the characters within the entry area 1900 and further changes the line in the stage where he/she has entered "Redwood" and enters "City". In the present embodiment, the handwritten character blocks separated by shifting in the entry position and changing of the line being performed in a compound manner are combined to obtain a single handwritten character block.

Details of Handwritten Character Block Combination Processing

Figure 20B:
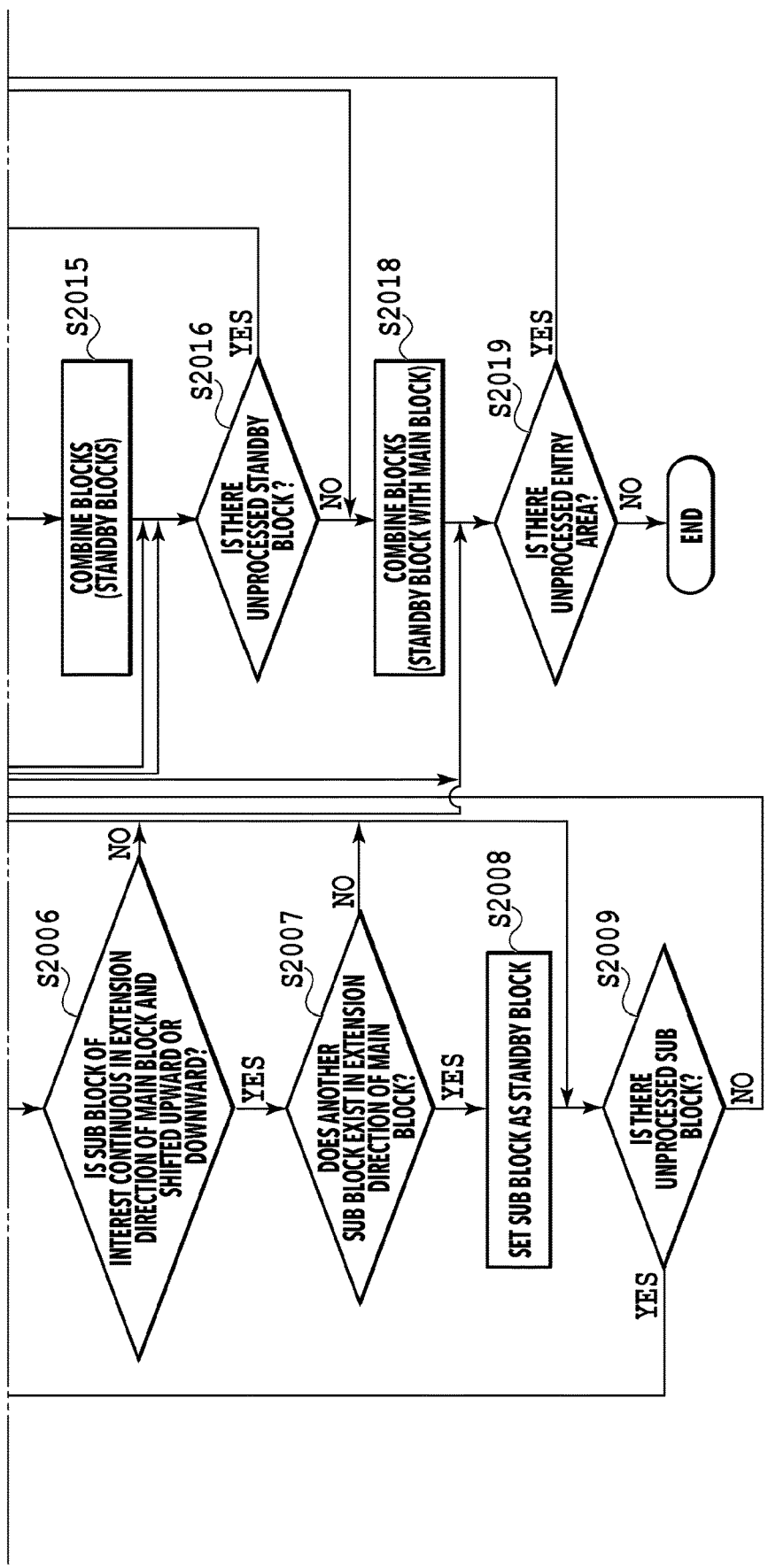
FIG. 20 is a diagram showing a relationship between FIGS. 20A and 20B, and FIGS. 20A and 20B are flowcharts showing details of handwritten character block combination processing according to a third embodiment.

FIGS. 20A and 20B are flowcharts showing details of the handwritten character block combination processing according to the present embodiment. In the following, along the flow in FIGS. 20A and 20B, the combination processing for extracting the plurality of separated handwritten character blocks as shown in FIG. 19A as a single handwritten character block is explained in detail.

S2001 to S2006 correspond to S1501 to S1506 in the flow in FIGS. 15A and 15B of the first embodiment and there is no difference, and therefore, explanation is omitted. At S2007 that follows, whether a sub block other than the sub block of interest exists in the extension direction of the main block is determined. At the time of this determination, as at S1507 described previously, for example, another sub block does not need to exist at the position perfectly aligned in the horizontal direction with the main block and it may be possible to include a shift in the height direction (y-coordinate) by an amount corresponding to, for example, one character in the allowable range. This condition exists for determining whether a handwritten character exists that is entered after shifting the entry position (baseline) in order to include all the characters in the entry area and further shifting the baseline for the purpose of including the remaining characters. In a case where this condition is satisfied, the processing advances to S2008 and in a case where this condition is not satisfied, the processing advances to S2009. Here, in the extension direction of the handwritten character block 1901, which is the main block, another handwritten characters "City" exists, and therefore, the determination results are "Yes" and the processing advances to next S2008.

At S2008, the sub block determined to be capable of being combined with the main block in the determination of whether or not combination is possible so far (S2005 to S2007) is set as a standby block. This processing is for, in a case where there exists a plurality of sub blocks on the right side of the main block, performing combination after combining in advance the plurality of sub blocks into one block. In the example in FIG. 19A, the two handwritten character blocks 1902 and 1903 located to the right of the handwritten character block 1901, which is the main block, are set as the standby blocks.

At S2009, whether an unprocessed sub block remains within the entry area of interest is determined. In a case where there is an unprocessed sub block, the processing returns to S2004 and the processing is continued by taking the next sub block of interest as a target. On the other hand, in a case where the processing for all the sub blocks is completed, the processing advances to S2010.

At S2010, in accordance with the number of set standby blocks, the processing is branched. In a case where the number of standby blocks is two or more, the processing advances to S2011, in a case where the number is one, the processing advances to S2018, and in a case where no standby block is set (the number is zero), the processing advances to S2019. Here, in the case of the entry area 1900, the two standby blocks are set, and therefore, the processing advances to S2011. Then, at S2011 to S2016, the determination of whether or not the standby blocks can be combined and the combination processing are performed.

First, at S2011, the standby block corresponding to the character string estimated to be described first of the plurality of standby blocks is set as the initial value of the reference block, which serves as the reference of the determination of whether or not the standby blocks can be combined. Here, the handwritten character block 1902 is set as the initial value of the reference block.

S2012-S2016 form loop processing for each remaining standby block. By this loop processing, whether or not the standby blocks can be combined is determined.

At S2012, among the remaining standby blocks, the standby block of interest is determined. Here, as the standby block of interest, the handwritten character block 1903 is selected.

At S2013, as at S1806 in the flow in FIG. 18A of the second embodiment, whether the determined of interest exists at the line change position of the reference block is determined. In a case where the determination results indicate that the movement is determined to be caused by the line change, the processing advances to S2014 and in other cases, the processing advances to S2016. Here, the leftmost end of the handwritten character block 1903 is the position more leftward than the rightmost end of the handwritten character block 1902. Then, the uppermost end of the handwritten character block 1903 is lower than lowermost end of the handwritten character block 1902. Consequently, the determination results are "Yes" and the processing advances to next S2014.

At S2014, as at S1807 in the flow in FIG. 18B of the second embodiment, whether the rightmost end of the block after combination exceeds the entry area of interest in a case where the standby block of interest is combined to the right side of the reference block is determined. In a case where the results of the determination indicate that the rightmost end of the block after combination exceeds the entry area, the processing proceeds to S2015 and in other cases, the processing advances to S2016. Here, in a case where the handwritten character block 1903 is added to the right side of the handwritten character block 1902, which is the reference block, the rightmost end of the block after combination exceeds the entry area 1900. Consequently, the determination results are "Yes" and the processing advances to next S2015.

Figure 19B:
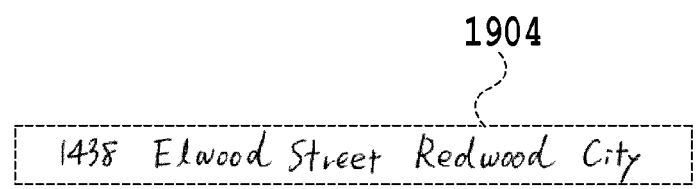

At S2015, the processing to combine the standby block of interest with the standby block, which is the reference block, is performed. Due to this, a provisionally combined block (combined image) obtained by combining the standby blocks is generated. Here, the provisionally combined block (see FIG. 19B) corresponding to the character string "Redwood City", which is obtained by combining the handwritten character blocks 1902 and 1903 is obtained. By the processing such as this, the standby blocks are combined before the combination with the main block is performed.

At S2016, whether an unprocessed standby block remains is determined. In a case where there is an unprocessed standby block, first, the processing advances to S2017 and the reference block is updated. Updating of the reference block is processing to set the handwritten character block, which is the standby block of interest so far, as the next reference block. Then, after updating, the processing returns to S2012 and the same processing is continued by taking the next standby block of interest as a target. Due to this, even in a case where the line change has been performed a plurality of times, it is made possible to cope with the case. On the other hand, in a case where the processing for all the standby blocks is completed, the processing advances to S2018.

At S2018, the processing to combine the provisionally combined block or the single standby block that is not the target of the combination processing with the main block is performed. Here, the combined block 1904 as shown in FIG.

19B is obtained finally, which is the handwritten character block 1901 as the main block combined with the provisionally combined block (not shown schematically) that combines "Redwood" and "City".

At S2019, whether or not the above-described loop processing is completed for all the entry areas is determined. In a case where there is an unprocessed entry area, the processing returns to S2002 and the processing is continued by taking the next entry area as a target. On the other hand, in a case where the processing for all the entry areas is completed, this processing is terminated and the processing returns to the flow in FIG. 12.

The above is the contents of the handwritten character block combination processing according to the present embodiment. Each of the above-described conditions described as the conditions at the time of determining whether to set as the standby block or whether to combine the standby blocks is not necessarily required and this is the same as in the first and second embodiments.

As described above, according to the present embodiment, even in a case where handwritten characters are discontinuous due to a compound factor, it is possible to extract the handwritten characters as a single continuous character block. As a result of that, it is possible to improve the character recognition accuracy in the OCR processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to improve character recognition accuracy of handwritten characters, originally a single continuous character string, described discontinuously.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-205910, filed Dec. 11, 2020, which is hereby incorporated by reference wherein in its entirety.

What is claimed is:

1. An information processing apparatus comprising:
one or more memories that store a program; and
one or more processors that execute the program to automatically perform:
separating a first image area including handwritten characters from a document image obtained by scanning a document;
extracting one or more character blocks each of which consists of some of the handwritten characters in proximity to one another and having a common baseline from the separated first image area;
generating, in a case where a plurality of character blocks is extracted from the first image area in the extracting, a combined single character block by combining character blocks based on a position relationship of the plurality of character blocks; and
performing optical character recognition processing for the generated combined single character block to obtain a character recognition result of the generated combined single character block.

2. The information processing apparatus according to claim 1, wherein
in the generating:
the plurality of extracted character blocks is grouped;
a character block forming a main character row of character blocks configuring a group is determined to be a first character block; and
in a case where a second character block other than the first character block, which is a character block configuring the group, satisfies a predetermined condition, the combined single character block is generated by combining the second character block with the first character block.

3. The information processing apparatus according to claim 2, wherein
in the separating, a second image area representing a state of the document before the handwritten character is entered is further separated from the document image and
the grouping is processing to group the plurality of extracted character blocks into groups for each blank area corresponding to an entry field for handwriting relating to a specific item in the second image area.

4. The information processing apparatus according to claim 3, wherein
the character block forming the main character row is a character block located at a starting position from which a character is written in the blank area or a character block whose block length or block size is the largest.

5. The information processing apparatus according to claim 4, wherein
the predetermined condition includes that the second character block exists at a line change position of the first character block.

6. The information processing apparatus according to claim 5, wherein
the predetermined condition further includes that in a case where the second character block is combined with the first character block, a character block after combination exceeds the blank area.

7. The information processing apparatus according to claim 5, wherein the predetermined condition further includes at least that a ratio of a character size of the second character block to a character size of the first character block is within a predetermined range.

8. The information processing apparatus according to claim 2, wherein
the predetermined condition includes that the second character block is continuous in an extension direction of the first character block and a baseline of the second character block is shifted from a baseline of the first character block.

9. The information processing apparatus according to claim 8, wherein
the predetermined condition further includes that a black pixel area in the first image area exists in the extension direction of the first character block.

10. The information processing apparatus according to claim 8, wherein
the predetermined condition further includes at least that a ratio of a character size of the second character block to a character size of the first character block is within a predetermined range.

11. The information processing apparatus according to claim 1, wherein
in the generating:
the plurality of extracted character blocks is grouped;
a character block forming a main character row of character blocks configuring a group is determined to be a first character block; and
in a case where a second character block and a third character block other than the first character block, which are character blocks configuring the group, satisfy a predetermined condition, the combined single character block is generated by combining the second character block and the third character block with the first character block.

12. The information processing apparatus according to claim 11, wherein
in the separating, a second image area representing a state of the document before the handwritten character is entered is further separated from the document image and
the grouping is processing to group the plurality of extracted character blocks into groups for each blank area corresponding to an entry field for handwriting relating to a specific item in the second image area.

13. The information processing apparatus according to claim 11, wherein
the predetermined condition includes that the second and the third character blocks exist in an extension direction of the first character block.

14. The information processing apparatus according to claim 13, wherein,
the predetermined condition further includes that the third character block exists at a line change position of the second character block.

15. The information processing apparatus according to claim 13, wherein
the predetermined condition further includes that in a case where the third character block is combined with the second character block, a character block after combination exceeds the blank area.

16. The information processing apparatus according to claim 13, wherein the predetermined condition further includes at least that a ratio of a character size of the second character block to a character size of the first character block is within a predetermined range.

17. A control method of an information processing apparatus, the control method comprising:
separating a first image area including handwritten characters from a document image obtained by scanning a document;
extracting one or more character blocks each of which consists of some of the handwritten characters in proximity to one another and having a common baseline from the separated first image area;
generating, in a case where a plurality of character blocks is extracted from the first image area in the extracting, a combined single character block by combining character blocks based on a position relationship of the plurality of character blocks; and
performing optical character recognition processing for the generated combined single character block to obtain a character recognition result of the generated combined single character block.

18. A non-transitory computer readable storage medium storing a program for causing a computer to perform a control method of an information processing apparatus, the control method comprising:
separating a first image area including handwritten characters from a document image obtained by scanning a document;
extracting one or more character blocks each of which consists of some of the handwritten characters in proximity to one another and having a common baseline from the separated first image area;
generating, in a case where a plurality of character blocks is extracted from the first image area in the extracting, a combined single character block by combining character blocks based on a position relationship of the plurality of character blocks; and
performing optical character recognition processing for the generated combined single character block to obtain a character recognition result of the generated combined single character block.

* * * * *